US011014593B2

(12) United States Patent
Knepp et al.

(10) Patent No.: US 11,014,593 B2
(45) Date of Patent: May 25, 2021

(54) TUGGER AND RIDER CART ASSEMBLY

(71) Applicant: J-Tec Industries, Inc., East Peoria, IL (US)

(72) Inventors: Joseph Wayne Knepp, Morton, IL (US); Kris A. Buckert, Deer Creek, IL (US); Nicholas Michael Kaiser, Morton, IL (US); Ryan Wilham Greiner, Peoria, IL (US)

(*) Notice: Subject to any disclaimer, the term of this patent is extended or adjusted under 35 U.S.C. 154(b) by 423 days.

(21) Appl. No.: 15/947,843

(22) Filed: Apr. 8, 2018

(65) Prior Publication Data

US 2019/0308651 A1    Oct. 10, 2019

(51) Int. Cl.
  *B62B 3/14*     (2006.01)
  *B62B 5/04*     (2006.01)
  *B62B 5/00*     (2006.01)

(52) U.S. Cl.
  CPC .......... *B62B 3/1404* (2013.01); *B62B 5/0083* (2013.01); *B62B 5/04* (2013.01)

(58) Field of Classification Search
  CPC ............ B62B 2207/00; B62B 2207/02; B62B 2207/04; B62B 3/04; B62B 3/1404; B62B 5/0083; B62B 5/04
  See application file for complete search history.

(56) References Cited

U.S. PATENT DOCUMENTS

| | | | |
|---|---|---|---|
| 3,122,244 A | 2/1964 | Corso | |
| 3,782,569 A | 1/1974 | Montgomery | |
| 4,127,202 A | 11/1978 | Jennings | |
| 4,128,163 A | 12/1978 | Rana et al. | |
| 4,148,404 A | 4/1979 | Heisler | |
| 4,515,518 A * | 5/1985 | Gilbert | B60P 1/6445 280/43.23 |
| 4,702,174 A | 10/1987 | Tredwell et al. | |
| 4,861,110 A | 8/1989 | Rumpke | |
| 5,072,960 A | 12/1991 | Sperko | |
| 5,078,415 A | 1/1992 | Goral | |
| 5,320,475 A * | 6/1994 | Pinder | B62B 1/08 414/343 |
| 5,439,069 A | 8/1995 | Beeler | |
| 5,476,180 A | 12/1995 | Konstant | |
| 5,478,189 A | 12/1995 | Agtuca | |
| 5,598,934 A | 2/1997 | Krummell et al. | |
| D413,550 S | 9/1999 | Otterson et al. | |

(Continued)

FOREIGN PATENT DOCUMENTS

| | | | |
|---|---|---|---|
| DE | 2226240 | 7/2011 | |
| DE | 202011100028 U1 * | 9/2011 | ............. B62D 63/06 |

*Primary Examiner* — Katy M Ebner
(74) *Attorney, Agent, or Firm* — Kilyk & Bowersox, P.L.L.C.

(57) ABSTRACT

According to some embodiments, an improved tugger and rider cart assembly system is presented. The system comprising a tugger cart with a central space to receive a rider cart; the tugger cart having both front side and rear side pluralities of transport wheels approximately parallel to, but not touching, ground; a front side and a rear side loading wheel positioned closer to the ground than the transport wheels; a rider cart having a first wing and a second wing, both wings having a curved portion; and wherein the loading wheels and wing curved portions can be operatively connected to allow a user to move the rider cart onto the tugger cart thereby allowing the tugger cart to transport the rider cart.

7 Claims, 34 Drawing Sheets

(56) References Cited

U.S. PATENT DOCUMENTS

| | | |
|---|---|---|
| 6,071,063 A | 6/2000 | McGrath et al. |
| 6,092,677 A | 6/2000 | Krummell, Jr. et al. |
| 6,086,308 A | 7/2000 | Sjogren et al. |
| 6,138,815 A | 10/2000 | Reiners et al. |
| 6,220,379 B1 | 4/2001 | Schugt et al. |
| 6,386,560 B2 | 5/2002 | Calender |
| 6,390,759 B1 | 5/2002 | Novak et al. |
| 6,648,573 B1 | 11/2003 | Davison |
| 6,669,213 B2 | 12/2003 | Woerner |
| 6,742,790 B2 | 6/2004 | Seagraves et al. |
| 6,851,562 B2 | 2/2005 | Gorniak et al. |
| 6,866,463 B2 * | 3/2005 | Riordan .................. B62B 3/04 280/79.3 |
| 6,880,838 B2 | 4/2005 | Hjorth |
| 6,974,140 B2 | 12/2005 | Neuman |
| 6,997,666 B1 | 2/2006 | Rodgers et al. |
| 7,004,489 B2 | 2/2006 | Brown |
| 7,014,198 B2 | 3/2006 | Everitt et al. |
| 7,063,496 B2 | 6/2006 | Jackson et al. |
| 7,156,608 B2 | 1/2007 | Henry |
| 7,300,063 B1 | 11/2007 | Prizmich |
| 7,416,196 B2 | 8/2008 | Brown |
| 7,497,448 B2 | 3/2009 | Brown |
| 8,167,061 B2 | 5/2012 | Scheuerman et al. |
| 8,302,975 B2 * | 11/2012 | Hergeth ............... B62D 53/005 280/47.19 |
| 8,505,933 B2 * | 8/2013 | Bernard ................. B62B 3/006 280/33.998 |
| 9,078,967 B2 * | 7/2015 | Oerter ................. A61M 1/1656 |
| 9,211,900 B2 * | 12/2015 | Knepp ..................... B62B 3/08 |
| 9,290,214 B2 * | 3/2016 | Badura .................. B62D 53/00 |
| 9,862,435 B2 * | 1/2018 | Scarth .................... B62D 53/04 |
| 10,093,334 B1 * | 10/2018 | Brown ..................... B62B 3/18 |
| 10,189,492 B2 * | 1/2019 | Gundogan ............. B62B 3/008 |
| 10,391,625 B2 * | 8/2019 | Gang ...................... B25H 1/12 |
| 2003/0006586 A1 | 1/2003 | Comilla |
| 2003/0075887 A1 | 4/2003 | Malone, Jr. |
| 2004/0179929 A1 | 9/2004 | Van Mill |
| 2005/0079039 A1 | 4/2005 | Neumann et al. |
| 2005/0275179 A1 | 12/2005 | Whittington |
| 2006/0042841 A1 | 3/2006 | Russell |
| 2006/0078409 A1 * | 4/2006 | Takeda ................. B66F 9/0754 414/343 |
| 2007/0176381 A1 | 8/2007 | Van Rheenen |
| 2008/0041644 A1 | 2/2008 | Tudek et al. |
| 2012/0139209 A1 | 6/2012 | Weiss |
| 2019/0270472 A1 * | 9/2019 | Akamatsu ............ B62B 5/0093 |
| 2020/0001907 A1 * | 1/2020 | Scarth ...................... B62B 5/00 |
| 2020/0101994 A1 * | 4/2020 | Eckerley .................. B62B 3/02 |
| 2020/0223468 A1 * | 7/2020 | Azumi ................... B62D 53/00 |

* cited by examiner

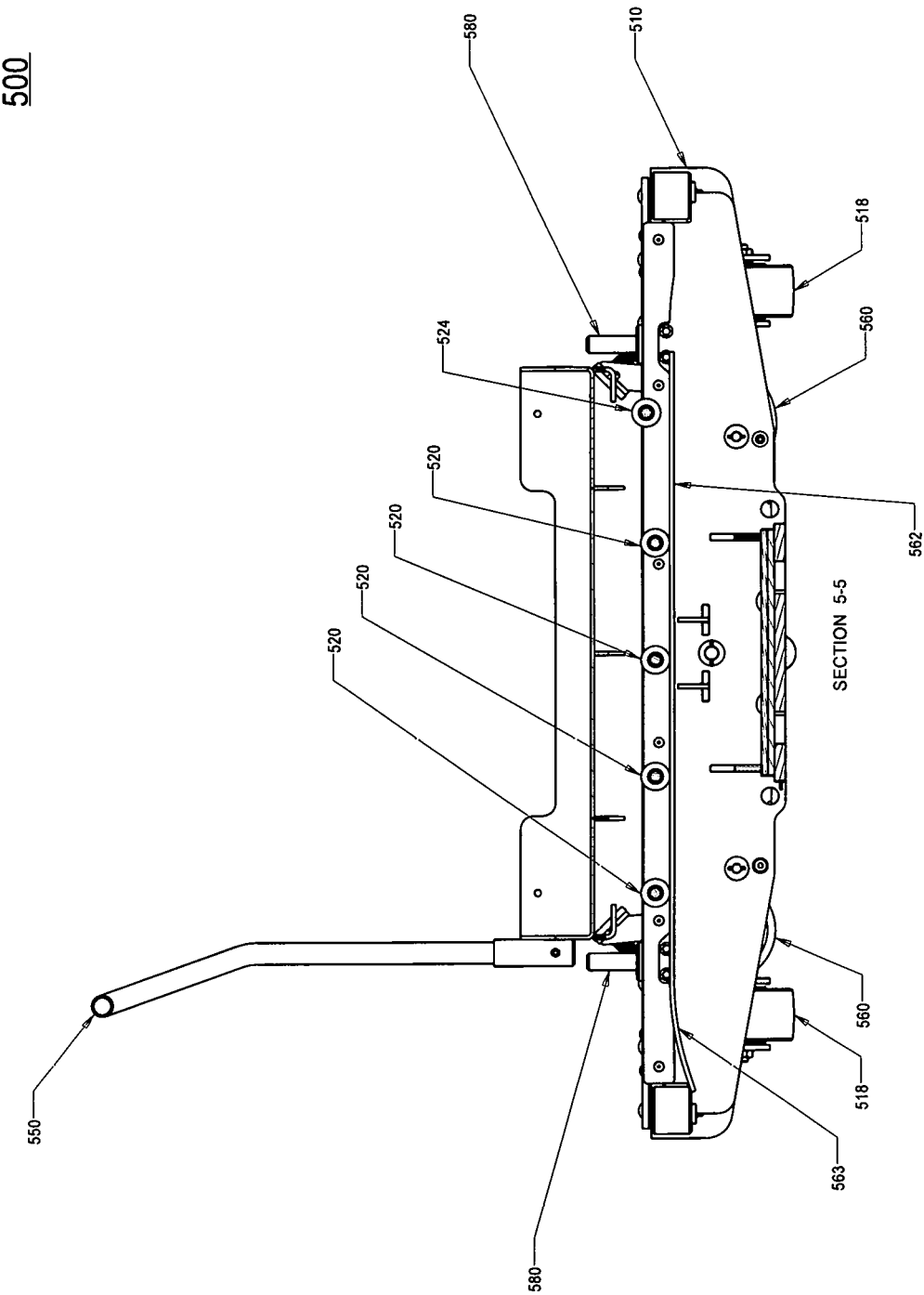

TUGGER AND RIDER CART ASSEMBLY

FIELD

An improved tugger and rider cart assembly for transporting materials is generally described.

BACKGROUND

The present invention relates to an improved tugger and rider cart assembly, and more particularly, to a rider cart that may be easily attached to a tugger cart.

In the world of intra-plant material handling, a common approach to conveying material from one location to another is called a tugger/rider cart system. The system consists of three components; a tugger truck, tugger cart, and rider cart. The tugger truck pulls a train of tugger carts, with rider carts on board, from location to location in a factory or warehouse. For example, the rider carts are loaded with material at a picking station or supermarket. They are then loaded on to the tugger carts. After that, they are tugged to the unload area, unloaded off of the tugger carts, and pushed into their final position. At this point, the empty tugger carts may be reloaded with empty push carts and returned to the picking station.

One issue companies have with this type of system is being able to efficiently and ergonomically load and unload the rider carts on to the tugger carts. Currently, hydraulic and manual devices are used. The hydraulic lift solution increases cost, presents plant safety issues (oil on the floor), and requires more equipment maintenance. Also, if a plant already has a fleet of tugger carts they will probably have to change their entire fleet to special tugger carts that have hydraulic systems driving even more cost. Both methods require an operator to pull a rider cart out of the tugger cart which is a very difficult motion and can cause an operator to over exert himself. The manual solution requires four swivel casters which makes the carts difficult to control while being pushed.

In view of the disadvantages associated with currently available methods and devices for tugger carts and rider carts, there is a need for a device that allows for easier and smoother loading of rider carts onto tugger carts.

BRIEF DESCRIPTION

According to an aspect, the present embodiments may be associated with an improved tugger and rider cart assembly comprising a tugger cart having a front side, and a rear side, operatively connected by a central portion to define a central space, and wherein the central space is dimensioned to receive a rider cart. The tugger cart also having a plurality of tugger wheels to allow the tugger cart to be transported easily. The tugger cart also having both a front side and rear side plurality of transport wheels approximately parallel to, but not touching, ground. The tugger cart having a first at least one front side loading wheel and a first at least one rear side loading wheel wherein the loading wheels are closer to the ground than the plurality of transport wheels. The rider cart having a first end and a second end operatively connected by a central portion to define a load carrying area. The rider cart also having a plurality of rider wheels operatively connected to the rider cart to allow it to be moved easily. The rider cart also having a first wing on its first end and a second wing on its second end. The first wing having a first wing first curved portion and the second wing having a second wing first curved portion. Wherein a user can push the rider cart next to the tugger cart and the first at least one front side loading wheel and the first wing first curved portion can be operatively connected to each other and the first at least one rear side loading wheel and second wing first curved portion can be operatively connected to each other thereby allowing a user to move the rider cart first wing onto the front side plurality of transport wheels and the rider cart second wing onto the rear side plurality of transport wheels. Once the rider cart is loaded onto the tugger cart such that the first wing is on the front side plurality of transport wheels second wing is on the rear side plurality of transport wheels the plurality of rider wheels are off of the ground and the plurality of tugger wheels support both the tugger cart and the rider cart to allow the tugger cart to transport the rider cart.

In one embodiment of an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels; the tugger cart having a first at least one rear side loading wheel, wherein the first at least one rear side loading wheel is closer to the ground than the rear side plurality of transport wheels; a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion; the rider cart second end having a second wing and the second wing having a second wing first curved portion; and wherein the first at least one front side loading wheel and the first wing first curved portion can be operatively connected to each other, and the first at least one rear side loading wheel and second wing first curved portion can be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels are off of the ground and the plurality of tugger wheels support both the tugger cart and the rider cart to allow the tugger cart to transport the rider cart.

In another embodiment of an improved tugger and rider cart assembly wherein the first wing further comprises a first wing second curved portion, and wherein the second wing further comprises a second wing second curved portion.

In still another embodiment the improved tugger and rider cart assembly wherein the tugger cart further comprises a second at least one front side loading wheel at an opposite end of the front side plurality of transport wheels from the first at least one front side loading wheel, and a second at least one rear side loading wheel at an opposite end of the rear side plurality of transport wheels from the first at least one rear side loading wheel.

In yet another embodiment the improved tugger and rider cart assembly wherein the improved tugger and rider cart assembly further comprises a locking mechanism to secure the rider cart to the tugger cart after loading the rider cart onto the tugger cart.

In an another embodiment of an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels and a second at least one front side loading wheel at an opposite end of the front side plurality of transport wheels from the first at least one front side loading wheel; the tugger cart having a first at least one rear side loading wheel, wherein the first at least one rear side loading wheel is closer to the ground than the rear side plurality of transport wheels and a second at least one rear side loading wheel at an opposite end of the rear side plurality of transport wheels from the first at least one rear side loading wheel; a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion and a first wing second curved portion; the rider cart second end having a second wing and the second wing having a second wing first curved portion and a second wing second curved portion; and wherein the first at least one front side loading wheel and the first wing first curved portion can be operatively connected to each other, and the first at least one rear side loading wheel and second wing first curved portion can be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion can be operatively connected to each other, and the second at least one rear side loading wheel and second wing second curved portion can be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels are off of the ground and the plurality of tugger wheels support both the tugger cart and the rider cart to allow the tugger cart to transport the rider cart.

In another embodiment the improved tugger and rider cart assembly wherein the improved tugger and rider cart assembly further comprises a locking mechanism to secure the rider cart to the tugger cart after loading the rider cart onto the tugger cart.

In still another embodiment an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels and a second at least one front side loading wheel at an opposite end of the front side plurality of transport wheels from the first at least one front side loading wheel; the tugger cart having a first at least one rear side loading wheel, wherein the first at least one rear side loading wheel is closer to the ground than the rear side plurality of transport wheels and a second at least one rear side loading wheel at an opposite end of the rear side plurality of transport wheels from the first at least one rear side loading wheel; a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion and a first wing second curved portion; the rider cart second end having a second wing and the second wing having a second wing first curved portion and a second wing second curved portion; wherein the first at least one front side loading wheel and the first wing first curved portion can be operatively connected to each other, and the first at least one rear side loading wheel and second wing first curved portion can be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion can be operatively connected to each other, and the second at least one rear side loading wheel and second wing second curved portion can be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels are off of the ground and the plurality of tugger wheels support both the tugger cart and the rider cart to allow the tugger cart to transport the rider cart; and a locking mechanism to secure the rider cart to the tugger cart after loading the rider cart onto the tugger cart.

In another embodiment an improved tugger cart comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels and a second at least one front side loading wheel at an opposite end of the front side plurality of transport wheels from the first at least one front side loading wheel; the tugger cart having a first at least one rear side loading wheel, wherein the first at least one rear side loading wheel is closer to the ground than the rear side plurality of transport wheels and a second at least one rear side loading wheel at an opposite end of the rear side plurality of transport wheels from the first at least one rear side loading wheel; and a locking mechanism to secure the rider cart to the tugger cart after loading the rider cart onto the tugger cart.

In another embodiment of an improved rider cart comprising: a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion and a first wing second curved portion; the rider cart second end having a second wing and the second wing having a second wing first curved portion and a second wing second curved portion.

In another embodiment of an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side first wing, the front side first wing having a first wing first curved portion; the tugger cart having a rear side second wing, the rear side second wing having a second wing first curved portion; the rider cart having a first end and a second end, the rider cart first end and rider cart second end operatively connected by a central portion to define a load carrying area; the rider cart having a plurality of rider wheels operatively connected to the rider cart; a rider cart first end having a first end plurality of transport wheels approximately parallel to, but not touching, ground; the rider cart second end having a second end plurality of transport wheels approximately parallel to, but not touching, the ground; the rider cart first end having a first at least one first end loading wheel, wherein the first at least one first end loading wheel is farther from the ground than the first end plurality of transport wheels; the rider cart second end having a first at least one second end loading wheel, wherein the first at least one second end loading wheel is farther from the ground than the second end plurality of transport wheels; and wherein the first at least one first end loading wheel and the first wing first curved portion can be operatively connected to each other, and the first at least one second end loading wheel and second wing first curved portion can be operatively connected to each other to allow a user to move the rider cart first end plurality of transport wheels onto the tugger cart front side first wing and the rider cart second end plurality of transport wheels onto the tugger cart rear side second wing such that when the rider cart first end plurality of transport wheels is on the tugger cart first wing and the second end plurality of transport wheels is on the tugger cart second wing the plurality of rider wheels are off of the ground and the plurality of tugger wheels support both the tugger cart and the rider cart to allow the tugger cart to transport the rider cart.

In yet another embodiment of an improved tugger and rider cart assembly wherein the front side first wing further comprises a first wing second curved portion, and wherein the rear side second wing further comprises a second wing second curved portion.

In still another embodiment the improved tugger and rider cart assembly wherein the rider cart further comprises a second at least one first end loading wheel at an opposite end of the first end plurality of transport wheels from the first at least one first end loading wheel, and a second at least one second end loading wheel at an opposite end of the second end plurality of transport wheels from the first at least one second end loading wheel, wherein the second at least one first end loading wheel and the second at least one second end loading wheel are farther from the ground than the first end plurality of transport wheels and the second end plurality of transport wheels.

In yet another embodiment the improved tugger and rider cart assembly wherein the improved tugger and rider cart assembly further comprises a locking mechanism to secure the rider cart to the tugger cart after loading the rider cart onto the tugger cart.

In another embodiment of an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side first wing and the front side first wing having a first wing first curved portion and a first wing second curved portion; the tugger cart having a rear side second wing and the rear side second wing having a second wing first curved portion and a second wing second curved portion; a rider cart having a first end and a second end, the rider cart first end and rider cart second end operatively connected by a central portion to define a load carrying area; the rider cart having a plurality of rider wheels operatively connected to the rider cart; the rider cart first end having a first end plurality of transport wheels approximately parallel to, but not touching, ground; the rider cart second end having a second end plurality of transport wheels approximately parallel to, but not touching, the ground; the rider cart first end having a first at least one first end loading wheel, and a second at least one first end loading wheel at an opposite end of the first end plurality of transport wheels from the first at least one first end loading wheel wherein the first at least one first end loading wheel and the second at least one first end loading wheel are farther from the ground than the first end plurality of transport wheels; the rider cart second end having a first at least one second end loading wheel, and a second at least one second end loading wheel at an opposite end of the second end plurality of transport wheels from the first at least one second end loading wheel wherein the first at least one second end loading wheel and the second at least one second end loading wheel are farther from the ground than the second end plurality of transport wheels; and wherein the first at least one first end loading wheel and the first wing first curved portion can be operatively connected to each other, and the first at least one second end loading wheel and second wing first curved portion can be operatively connected to each other to allow a user to move the rider cart first end plurality of transport wheels onto the tugger cart front side first wing and the rider cart second end plurality of transport wheels onto the tugger cart rear side second wing, or alternatively, the second at least one first end loading wheel and the first wing second curved portion can be operatively connected to each other, and the second at least one second end loading wheel and second wing second curved portion can be operatively connected to each other to allow a user to move the rider cart first end plurality of transport wheels onto the tugger cart front side first wing and the rider cart second end plurality of transport wheels onto the tugger cart rear side second wing such that when the rider cart first end plurality of transport wheels is on the tugger cart front side first wing and the second end plurality of transport wheels is on the tugger cart rear side second wing the plurality of rider wheels are off of the ground and the plurality of tugger wheels support both the tugger cart and the rider cart to allow the tugger cart to transport the rider cart.

In another embodiment the improved tugger and rider cart assembly wherein the improved tugger and rider cart assembly further comprises a locking mechanism to secure the rider cart to the tugger cart after loading the rider cart onto the tugger cart.

In yet another embodiment an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side first wing and the front side first wing having a first wing first curved portion and a front side first wing second curved portion; the tugger cart having a rear side second wing and the rear side second wing having a second wing first curved portion and a second wing second curved portion; a rider cart having a first end and a second end, the rider cart first end and rider cart second end operatively connected by a central portion to define a load carrying area; the rider cart having a plurality of rider wheels operatively connected to the rider cart; the rider cart first end having a first end plurality of transport wheels approximately parallel to, but not touching, ground; the rider cart second end having a second end plurality of transport wheels approximately parallel to, but not touching, the ground; the rider cart first end having a first at least one first end loading wheel, and a second at least one first end loading wheel at an opposite end of the first end plurality of transport wheels from the first at least one first end loading wheel wherein the first at least one first end loading wheel and the second at least one first end loading wheel are farther from the ground than the first end plurality of transport wheels; the rider cart second end having a first at least one second end loading wheel, and a second at least one second end loading wheel at an opposite end of the second end plurality of transport wheels from the first at least one second end loading wheel wherein the first at least one second end loading wheel and the second at least one second end loading wheel are farther from the ground than the second end plurality of transport wheels; wherein the first at least one first end loading wheel and the first wing first curved portion can be operatively connected to each other, and the first at least one second end loading wheel and second wing first curved portion can be operatively connected to each other to allow a user to move the rider cart first end plurality of transport wheels onto the tugger cart front side first wing and the rider cart second end plurality of transport wheels onto the tugger cart rear side second wing, or alternatively, the second at least one first end loading wheel and the first wing second curved portion can be operatively connected to each other, and the second at least one second end loading wheel and second wing second curved portion can be operatively connected to each other to allow a user to move the rider cart first end plurality of transport wheels onto the tugger cart front side first wing and the rider cart second end plurality of transport wheels onto the tugger cart rear side second wing such that when the rider cart first end plurality of transport wheels is on the tugger cart front side first wing and the second end plurality of transport wheels is on the rider cart rear side second wing the plurality of rider wheels are off of the ground and the plurality of tugger wheels support both the tugger cart and the rider cart to allow the tugger cart to transport the rider cart; and a locking mechanism to secure the rider cart to the tugger cart after loading the rider cart onto the tugger cart.

In another embodiment of an improved tugger and rider cart assembly ready to load comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels and a second at least one front side loading wheel at an opposite end of the front side plurality of transport wheels from the first at least one front side loading wheel; the tugger cart having a first at least one rear side loading wheel, wherein the first at least one rear side loading wheel is closer to the ground than the rear side plurality of transport wheels and a second at least one rear side loading wheel at an opposite end of the rear side plurality of transport wheels from the first at least one rear side loading wheel; a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion and a first wing second curved portion; the rider cart second end having a second wing and the second wing having a second wing first curved portion and a second wing second curved portion; wherein the first at least one front side loading wheel and the first wing first curved portion can be operatively connected to each other, and the first at least one rear side loading wheel and second wing first curved portion can be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion can be operatively connected to each other, and the second at least one rear side loading wheel and second wing second curved portion can be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels are off of the ground and the plurality of tugger wheels support both the tugger cart and the rider cart to allow the tugger cart to transport the rider cart; and a locking mechanism to secure the rider cart to the tugger cart after loading the rider cart onto the tugger cart.

In yet another embodiment of an improved tugger and rider cart assembly loading comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels and a second at least one front side loading wheel at an opposite end of the front side plurality of transport wheels from the first at least one front side loading wheel; the tugger cart having a first at least one rear side loading wheel, wherein the first at least one rear side loading wheel is closer to the ground than the rear side plurality of transport wheels and a second at least one rear side loading wheel at an opposite end of the rear side plurality of transport wheels from the first at least one rear side loading wheel; a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion and a first wing second curved portion; the rider cart second end having a second wing and the second wing having a second wing first curved portion and a second wing second curved portion; wherein the first at least one front side loading wheel and the first wing first curved portion can be operatively connected to each other, and the first at least one rear side loading wheel and second wing first curved portion can be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion can be operatively connected to each other, and the second at least one rear side loading wheel and second wing second curved portion can be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels are off of the ground and the plurality of tugger wheels support both the tugger cart and the rider cart to allow the tugger cart to transport the rider cart; and a locking mechanism to secure the rider cart to the tugger cart after loading the rider cart onto the tugger cart.

In still another embodiment of an improved tugger and rider cart assembly comprising: a tugger cart having a front side and a rear side, the tugger cart front side and the tugger cart rear side operatively connected by a central portion to define a central space wherein the central space is dimensioned to receive a rider cart; the tugger cart having a plurality of tugger wheels operatively connected to the tugger cart; the tugger cart having a front side plurality of transport wheels approximately parallel to, but not touching, ground; the tugger cart having a rear side plurality of transport wheels approximately parallel to, but not touching, the ground; the tugger cart having a first at least one front side loading wheel, wherein the first at least one front side loading wheel is closer to the ground than the front side plurality of transport wheels and a second at least one front side loading wheel at an opposite end of the front side plurality of transport wheels from the first at least one front side loading wheel; the tugger cart having a first at least one rear side loading wheel, wherein the first at least one rear side loading wheel is closer to the ground than the rear side plurality of transport wheels and a second at least one rear side loading wheel at an opposite end of the rear side plurality of transport wheels from the first at least one rear side loading wheel; a rider cart having a first end and a second end, the rider cart first end and rider cart second end operatively connected by a central portion to define a load carrying area; the rider cart having a plurality of rider wheels operatively connected to the rider cart; the rider cart first end having a first wing and the first wing having a first wing first curved portion and a first wing second curved portion; the rider cart second end having a second wing and the second wing having a second wing first curved portion and a second wing second curved portion; wherein the first at least one front side loading wheel and the first wing first curved portion can be operatively connected to each other, and the first at least one rear side loading wheel and second wing first curved portion can be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion can be operatively connected to each other, and the second at least one rear side loading wheel and second wing second curved portion can be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels are off of the ground and the plurality of tugger wheels support both the tugger cart and the rider cart to allow the tugger cart to transport the rider cart; and a locking mechanism to secure the rider cart to the tugger cart after loading the rider cart onto the tugger cart.

These and other features, aspects, and advantages of the various embodiments of the present invention will become better understood with reference to the following drawings, descriptions, and claims.

BRIEF DESCRIPTION OF THE FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 5C is a cross-sectional front view of a tugger cart assembly taken along lines 5-5 of FIG. 5B;

Figure 1A:
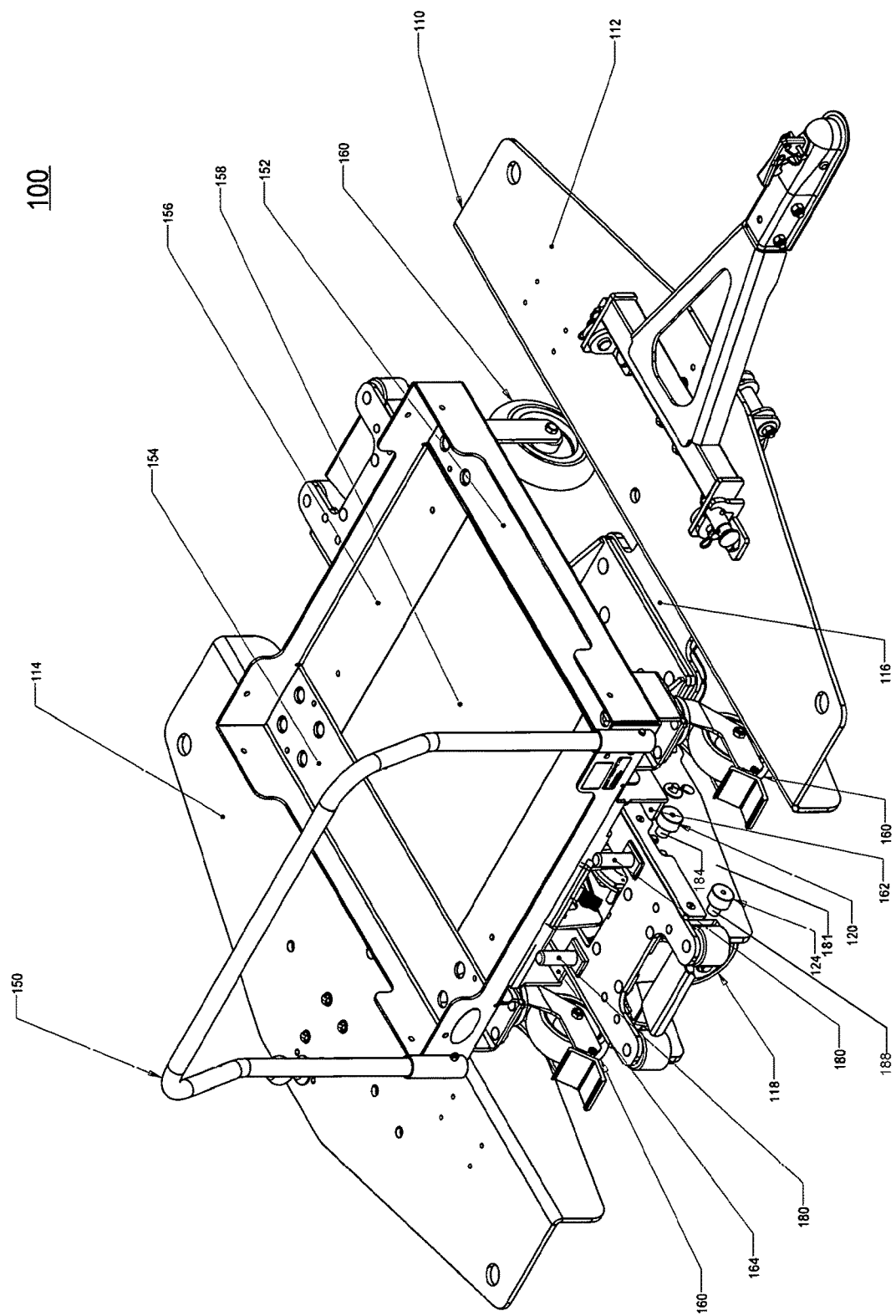
FIG. 1A is a perspective view of a tugger and rider cart assembly according to an embodiment.
Figure 1B:
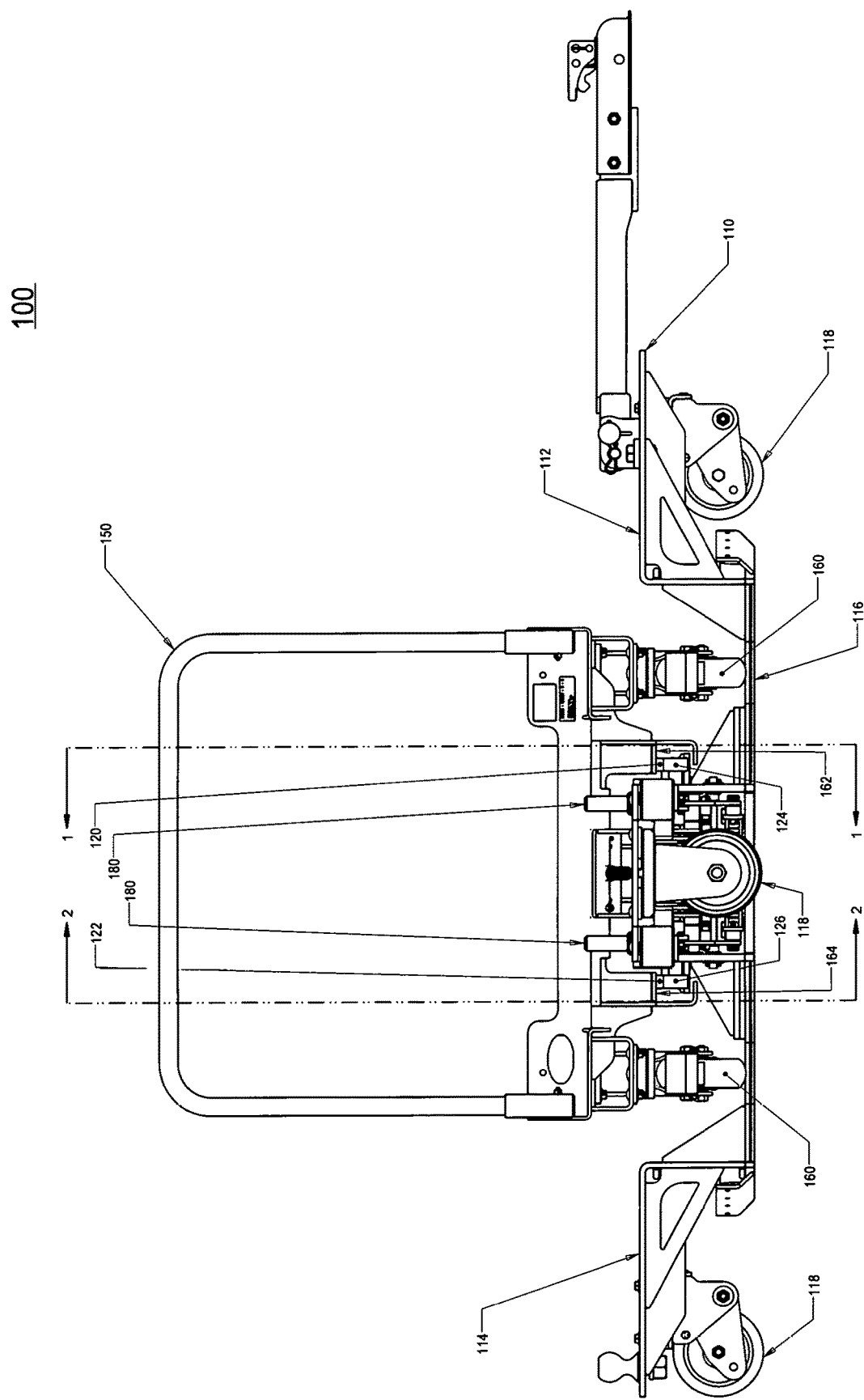
FIG. 1B is a side view of a tugger cart assembly according to an embodiment.
Figure 1C:
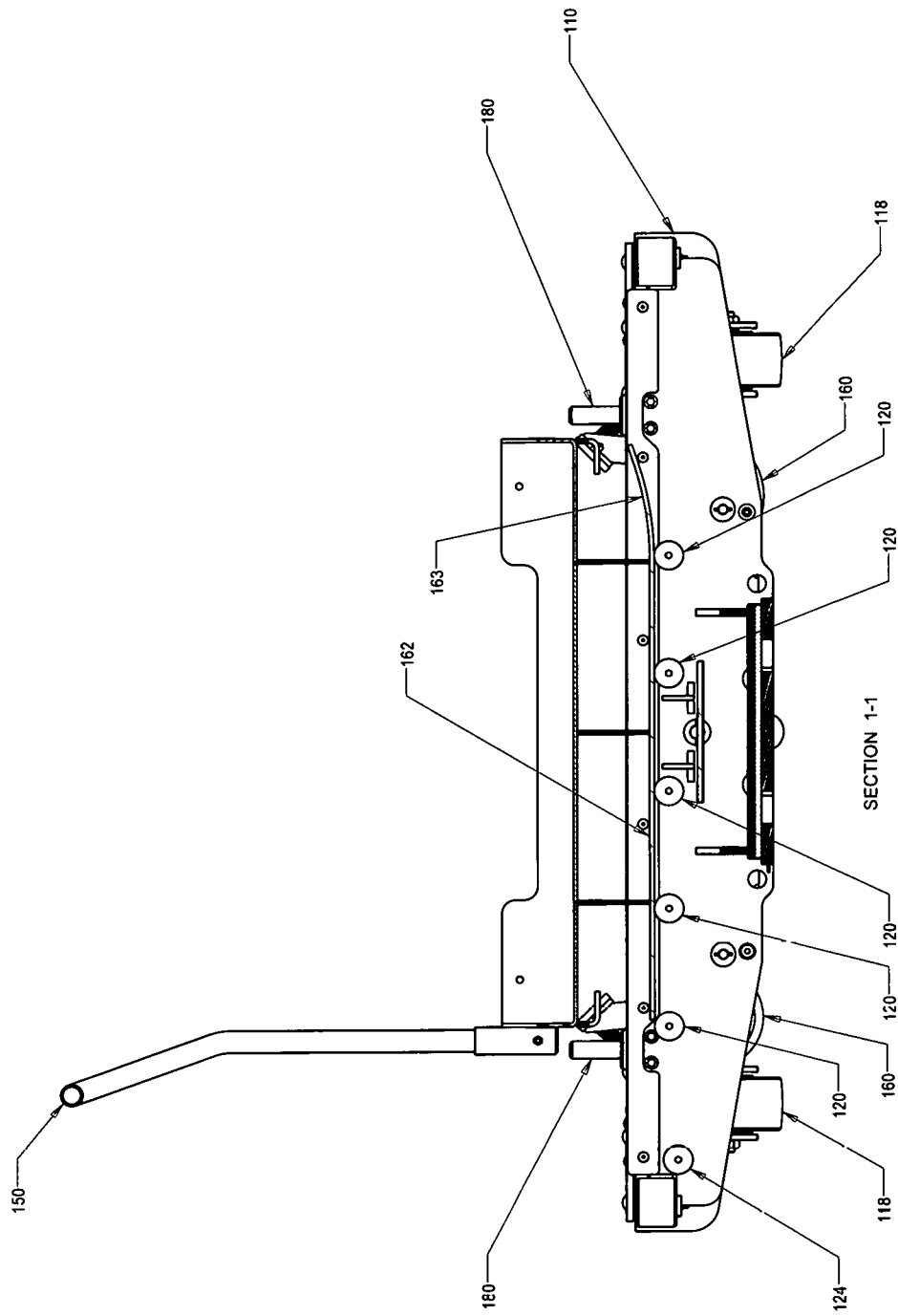
FIG. 1C is a cross-sectional front view of a tugger cart assembly taken along lines 1-1 of FIG. 1B.
Figure 1D:
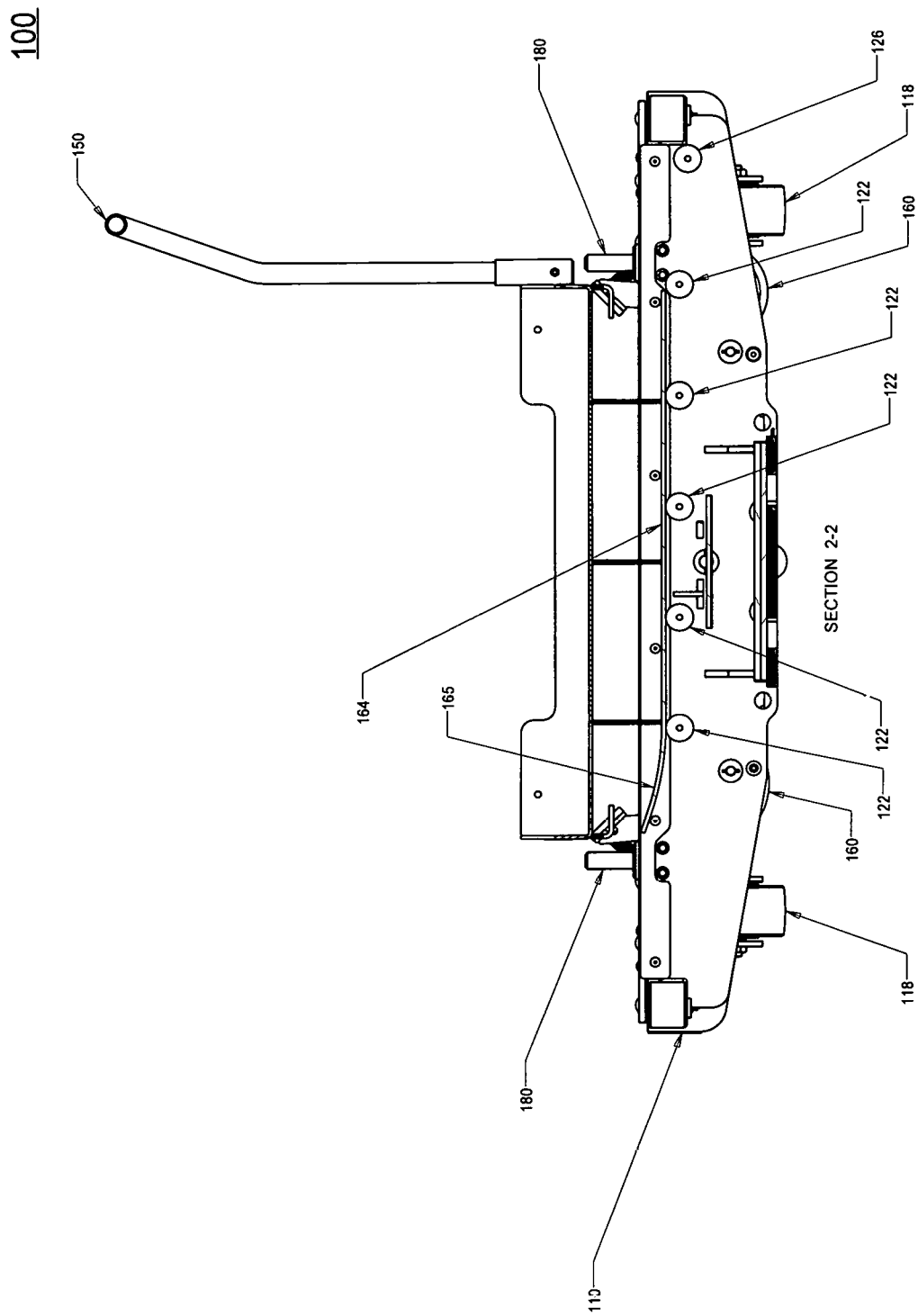
FIG. 1D is a cross-sectional rear view of a tugger cart assembly taken along lines 2-2 of FIG. 1B.
Figure 1E:
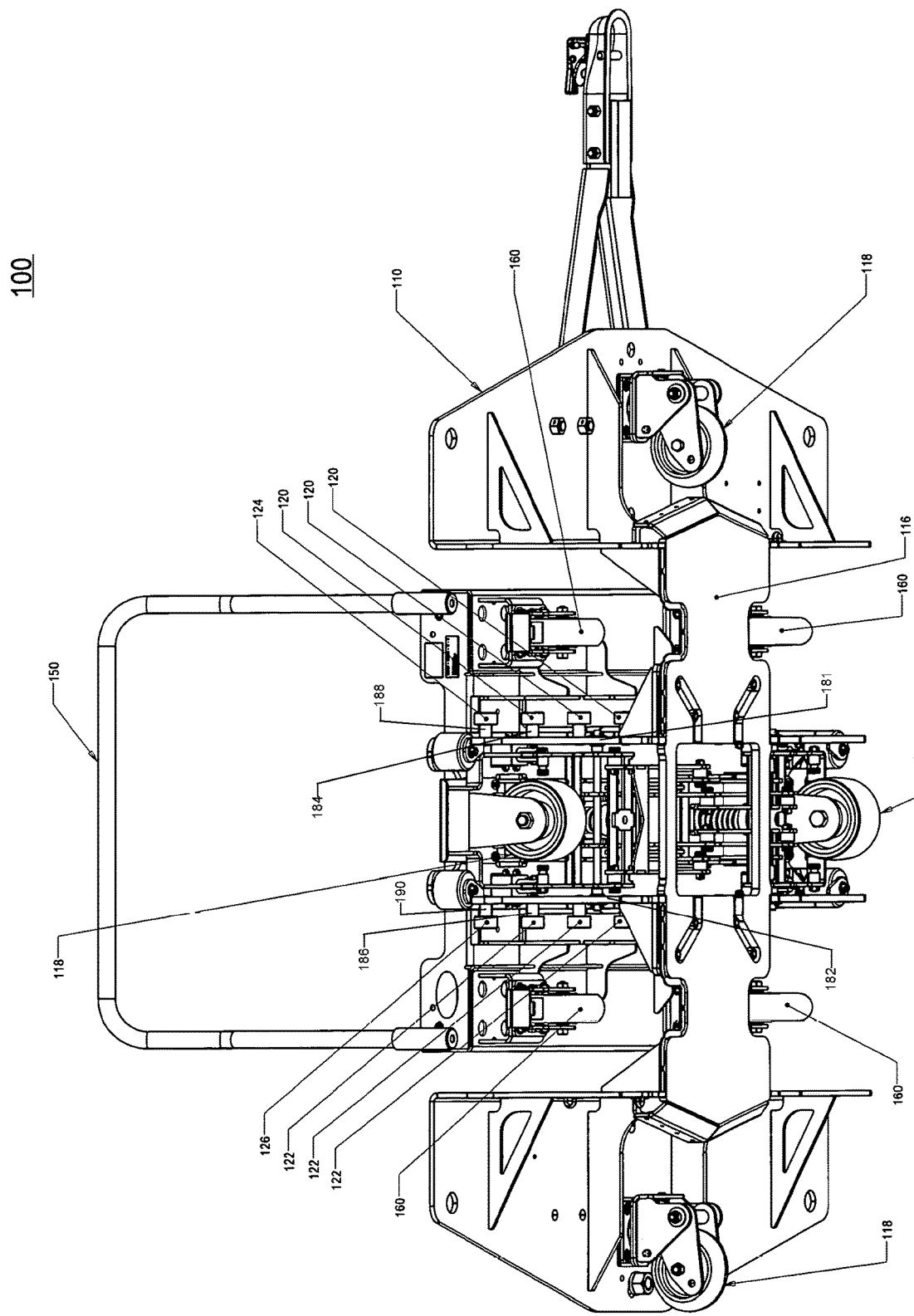
FIG. 1E is a perspective view of a tugger and rider cart assembly according to an embodiment.
Figure 2A:
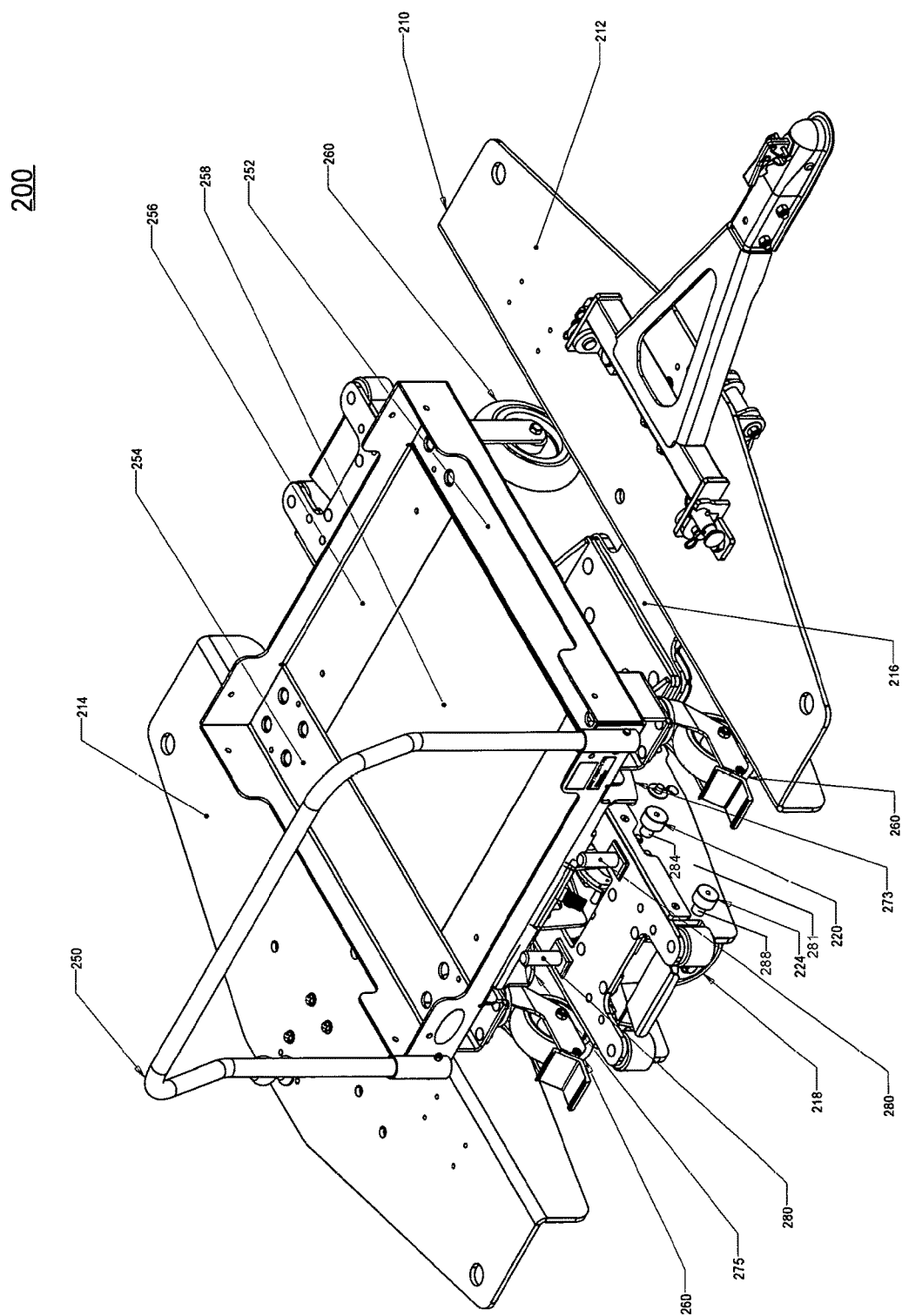
FIG. 2A is a perspective view of a tugger and rider cart assembly according to an embodiment.
Figure 2B:
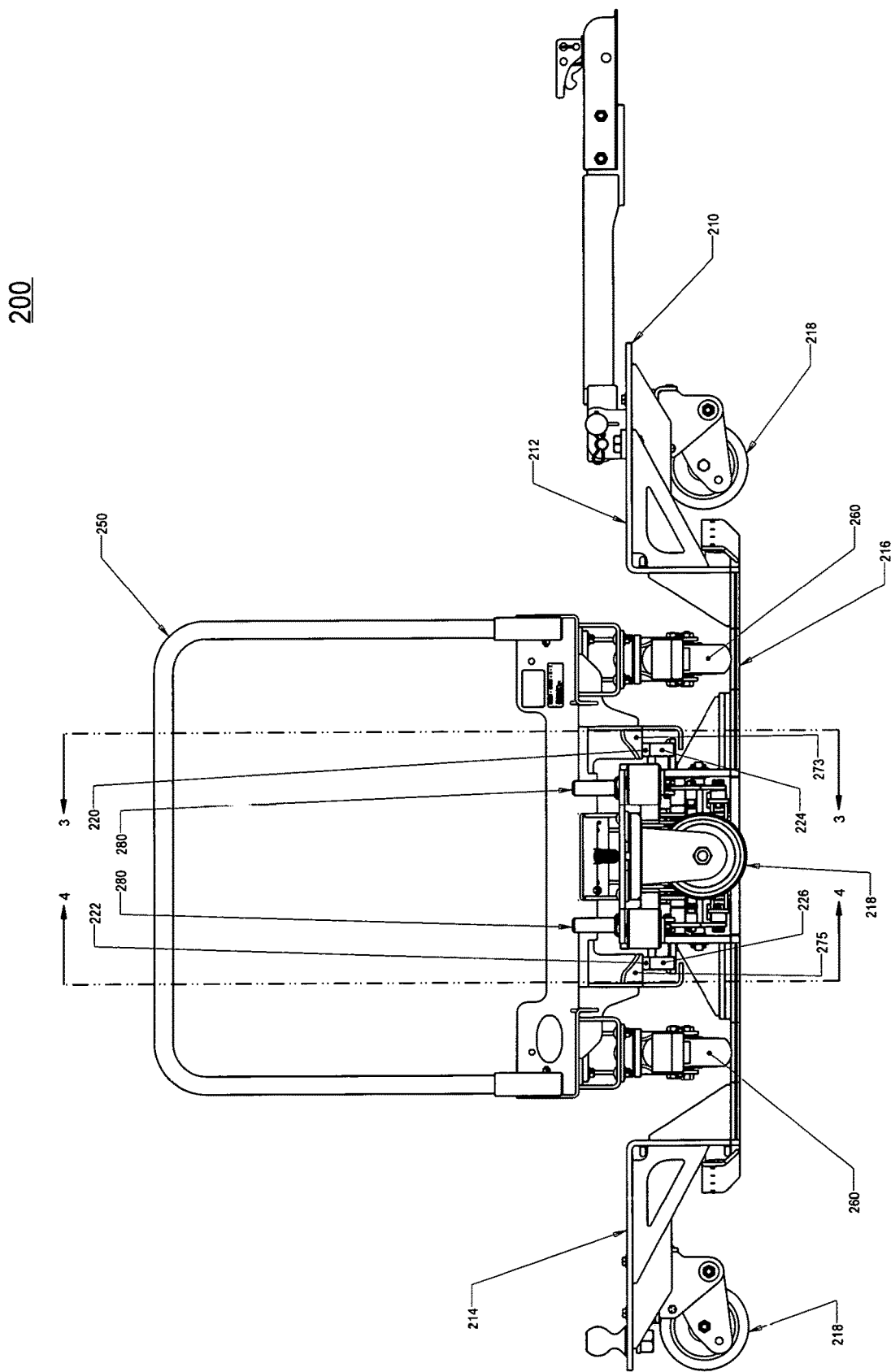
FIG. 2B is a side view of a tugger cart assembly according to an embodiment.
Figure 2C:
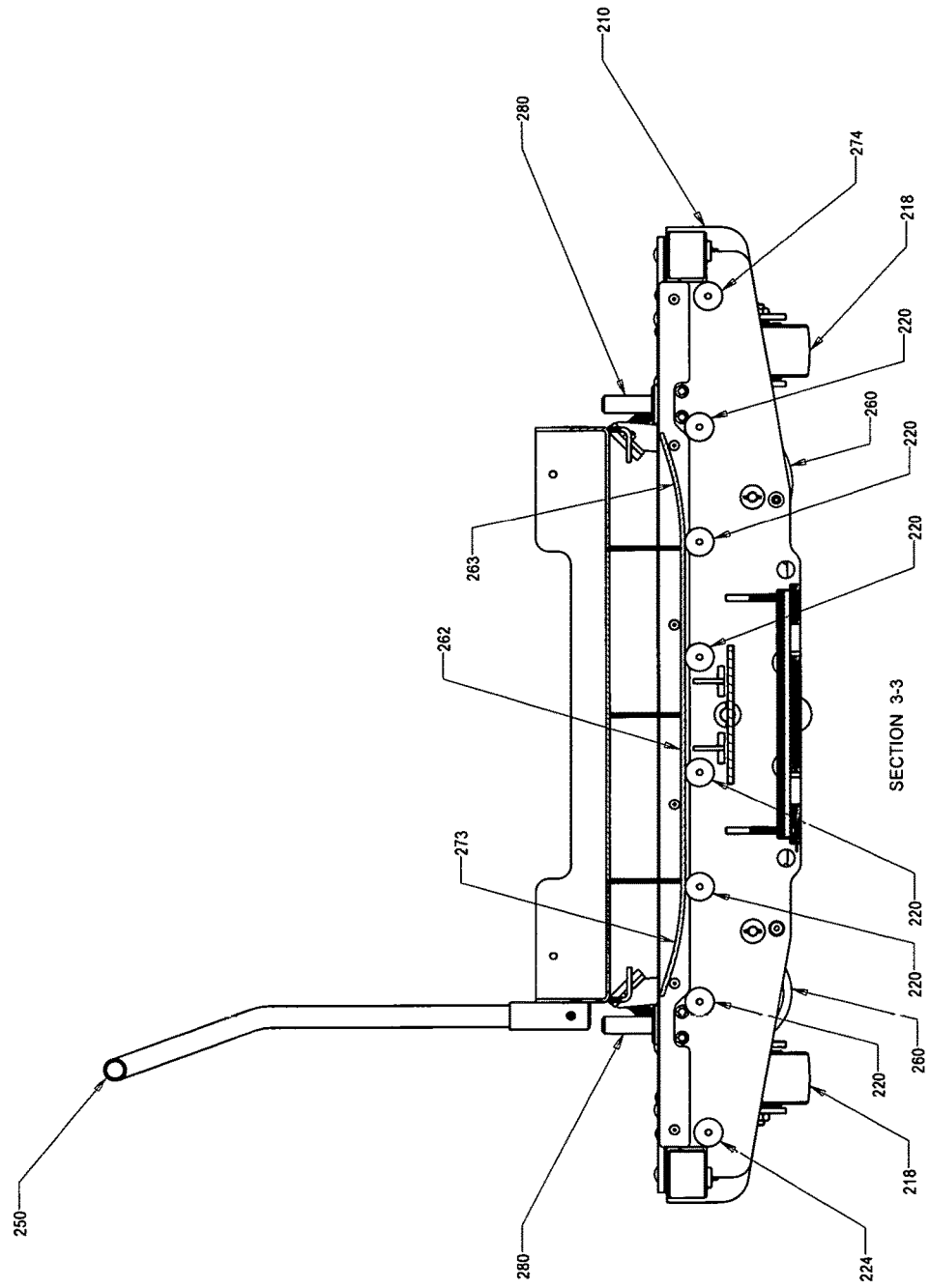
FIG. 2C is a cross-sectional front view of a tugger cart assembly taken along lines 3-3 of FIG. 2B.
Figure 2D:
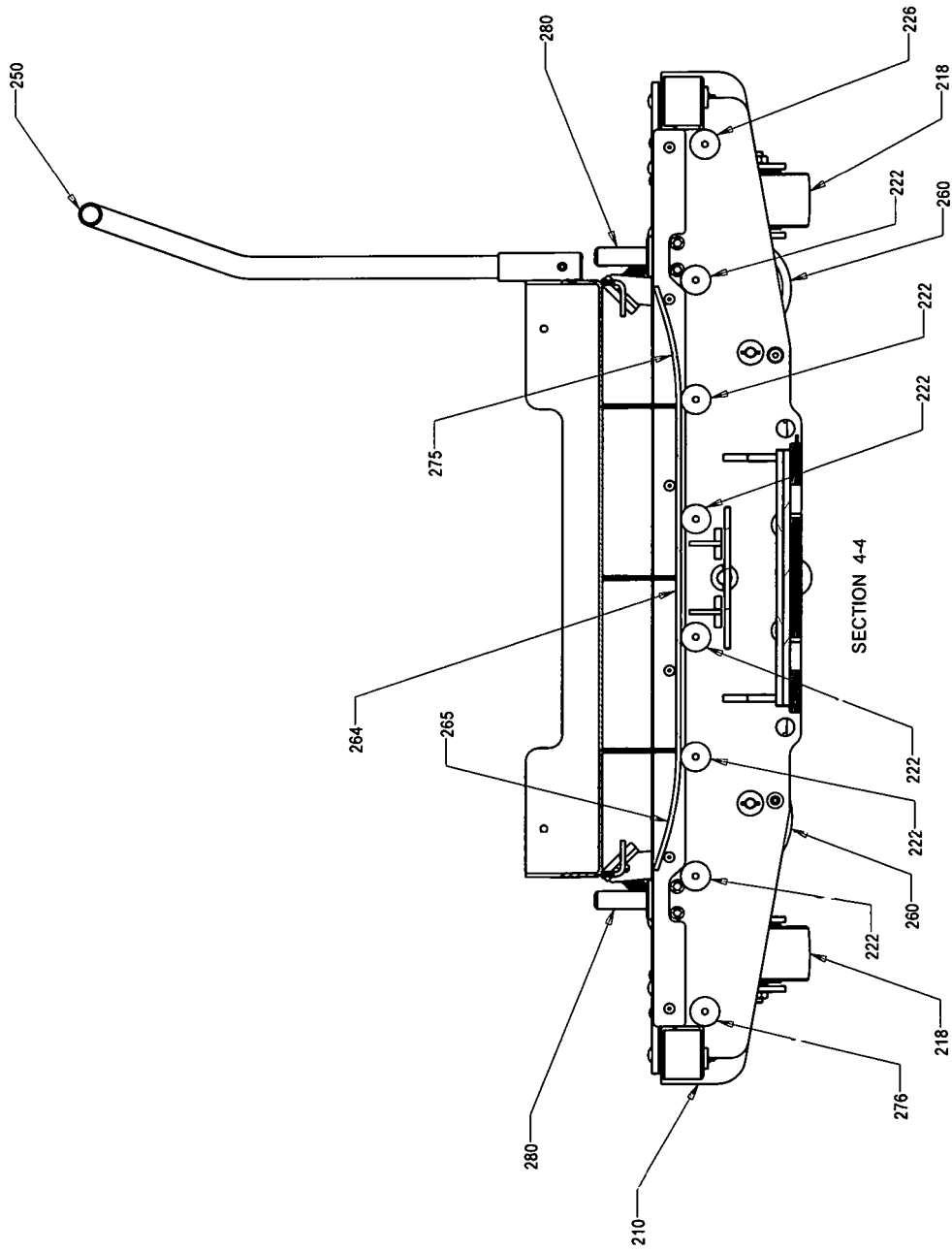
FIG. 2D is a cross-sectional rear view of a tugger cart assembly taken along lines 4-4 of FIG. 2B.
Figure 2E:
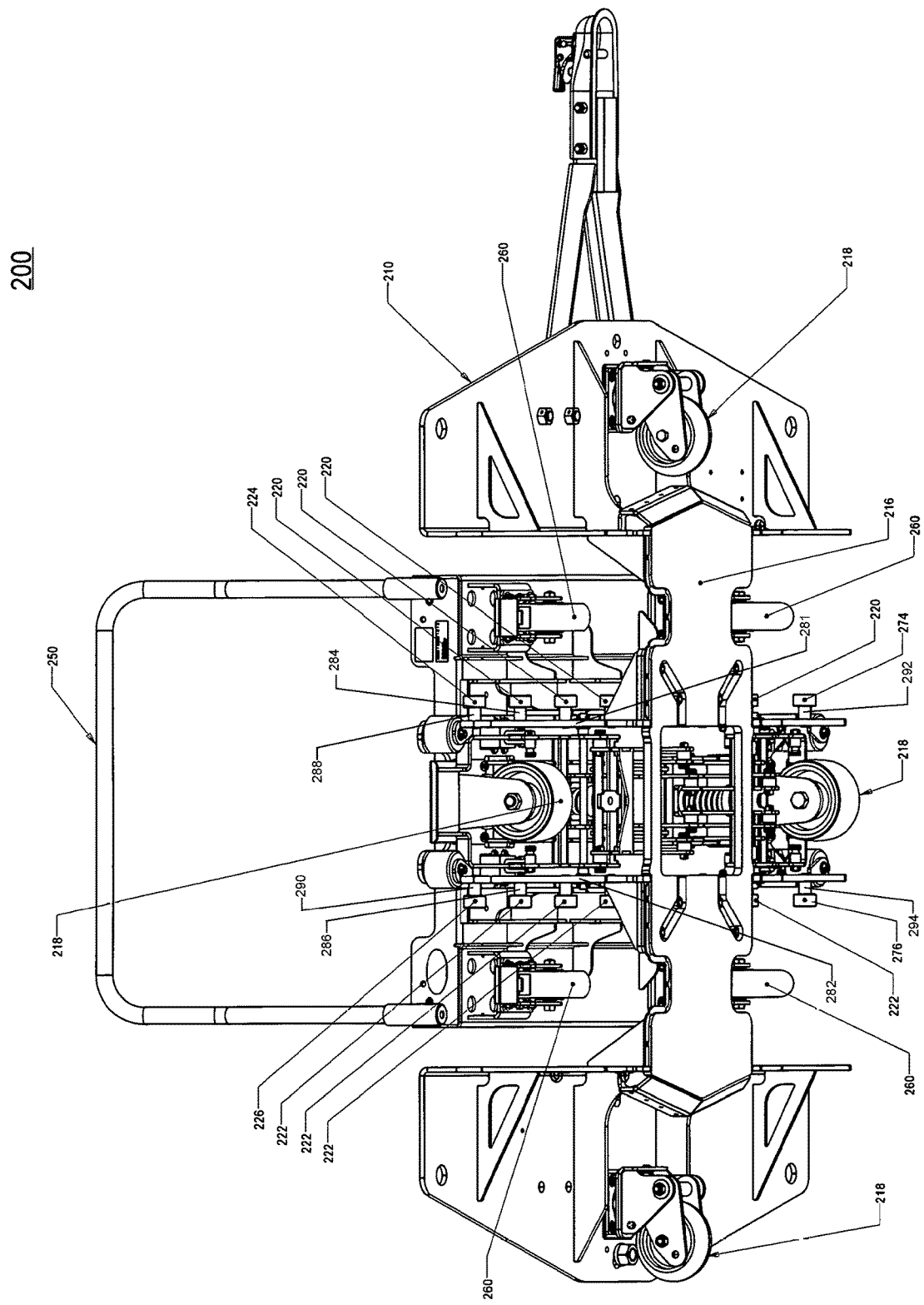
FIG. 2E is a perspective view of a tugger and rider cart assembly according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various embodiments. Each example is provided by way of explanation, and is not meant as a limitation and does not constitute a definition of all possible embodiments.

The term "wheel" may mean a wide variety of wheel types, including but not limited to, fixed wheels, caster wheels, swiveling wheels and the like as is well known to one skilled in the art. Further the "wheel" may be a wide variety of sizes and types to fit the particular use and environment of use as is well known to one skilled in the arts. Additionally, the term "wheel" may include wheels made out of a wide variety materials, including but not limited to, metal wheels, rubber wheels, synthetic wheels and the like as is well known to one skilled in the arts.

The term "curved portion" may mean a part having a curve with wide range of radii from about one (1) millimeter up to about thirty-six (36) inches and anywhere in between as is well known to one skilled in the art. In an embodiment the radii of the "curved portion" may be between fifteen (15) inches and twenty (20) inches. In another embodiment the radii of the "curved portion" may be between seventeen (17) inches and seventeen-and-one-half (17.5) inches. In yet another embodiment the radii of the "curved portion" may be seventeen-and-one-quarter (17.25) inches.

The term "closer to the ground" may mean a part is between one-tenth (0.1) of an inch to five (5) inches closer to the ground. In another embodiment term "closer to the ground" may mean a part is between one-quarter (0.25) of an inch to one (1) inch closer to the ground. In yet another embodiment term "closer to the ground" may mean a part is between one-third (0.33) of an inch to two-thirds (0.66) of an inch closer to the ground. In yet another embodiment term "closer to the ground" may mean a part is one-half (0.5) of an inch closer to the ground.

The term "locking mechanism" may include a wide variety of mechanisms to secure a rider cart to a tugger cart as is well known to one skilled in the art. The locking mechanism may be a variety of mechanisms, including but not limited to, friction plates, pins, latches and the like as is well known to one skilled in the art.

For purposes of illustrating features of the embodiments, a simple example will now be introduced and referenced throughout the disclosure. Those skilled in the art will recognize that this example is illustrative and not limiting and is provided purely for explanatory purposes. In the illustrative example and as seen in FIGS. 1A, 1B, 1C, 1D and 1E.

Turning now to FIGS. 1A, 1B, 1C, 1D and 1E which show an embodiment of an improved tugger and rider cart assembly (100) comprising: a tugger cart (110) having a front side (112) and a rear side (114), the tugger cart (110) front side (112) and the tugger cart (110) rear side (114) operatively connected by a central portion (116) to define a central space wherein the central space is dimensioned to receive a rider cart (150); the tugger cart (110) having a plurality of tugger wheels (118) operatively connected to the tugger cart (110); the tugger cart (110) having a front side plurality of transport wheels (120) approximately parallel to, but not touching, ground; the tugger cart (110) having a rear side plurality of transport wheels (122) approximately parallel to, but not touching, the ground; the tugger cart (110) having a first at least one front side loading wheel (124), wherein the first at least one front side loading wheel (124) is closer to the ground than the front side plurality of transport wheels (120); the tugger cart (110) having a first at least one rear side loading wheel (126), wherein the first at least one rear side loading wheel (126) is closer to the ground than the rear side plurality of transport wheels (122); a rider cart (150) having a first end (152) and a second end (154), the rider cart (150) first end (152) and rider cart (150) second end (154) operatively connected by a central portion (156) to define a load carrying area (158); the rider cart (150) having a plurality of rider wheels (160) operatively connected to the rider cart (150); the rider cart (150) first end (152) having a first wing (162) and the first wing (162) having a first wing first curved portion (163); the rider cart (150) second end (154) having a second wing (164) and the second wing (164) having a second wing first curved portion (165); and wherein the first at least one front side loading wheel (124) and the first wing first curved portion (163) can be operatively connected to each other, and the first at least one rear side loading wheel (126) and second wing first curved portion (165) can be operatively connected to each other to allow a user to move the rider cart (150) first wing (162) onto the front side plurality of transport wheels (120) and the rider cart (150) second wing (164) onto the rear side plurality of transport wheels (122) such that when the rider cart (150) first wing (162) is on the front side plurality of transport wheels (120) and the rider cart (150) second wing (164) is on the rear side plurality of transport wheels (122) the plurality of rider wheels (160) are off of the ground and the plurality of tugger wheels (118) support both the tugger cart (110) and the rider cart (150) to allow the tugger cart (110) to transport the rider cart (150).

In another embodiment, the central portion (116) can include a front sidewall (181) and a rear sidewall (182). The front sidewall (181) has an outer surface facing the front side (112) and the rear sidewall (182) has an outer surface facing the rear side (114). Each of the front side plurality of transport wheels (120) are coupled to the outer surface of the front sidewall (181) by respective front side axles (1841 and each of the rear side plurality of transport wheels (122) are coupled to the outer surface of the rear sidewall (182) by rear side axles (186). The first at least one front side loading wheel (124) is coupled to the outer surface of the front sidewall (181) by a front side loading axle (188) at a fixed position closer to the ground than is the front side plurality of transport wheels (120). The first at least one rear side loading wheel (126) is coupled to the outer surface of the rear sidewall (182) by a rear side loading axle (190) at a fixed position closer to the ground than is the rear side plurality of transport wheels (122).

Turning now to FIGS. 2A, 2B, 2C, 2D and 2E which show an embodiment of an improved tugger and rider cart assembly (200) wherein the first wing (262) further comprises a first wing second curved portion (273), and wherein the second wing (264) further comprises a second wing second curved portion (275).

In still another embodiment the improved tugger and rider cart assembly (200) wherein the tugger cart (210) further comprises a second at least one front side loading wheel (274) at an opposite end of the front side plurality of transport wheels (220) from the first at least one front side loading wheel (224), and a second at least one rear side loading wheel (276) at an opposite end of the rear side plurality of transport wheels (222) from the first at least one rear side loading wheel (226).

In yet another embodiment the improved tugger and rider cart assembly (200) wherein the improved tugger and rider cart assembly (200) further comprises a locking mechanism (280) to secure the rider cart (250) to the tugger cart (210) after loading the rider cart (250) onto the tugger cart (210). The locking mechanism (280) can include pegs upstanding from the central portion (216). At least a first peg of the pegs is on one side of the rider cart (250) and at least a second peg of the pegs is on an opposing side of the rider cart (250).

FIGS. 2A, 2B, 2C, 2D and 2E which show an another embodiment of an improved tugger and rider cart assembly (200) comprising: a tugger cart (210) having a front side (212) and a rear side (214), the tugger cart (210) front side (212) and the tugger cart (210) rear side (214) operatively connected by a central portion (216) to define a central space wherein the central space is dimensioned to receive a rider cart (250); the tugger cart (210) having a plurality of tugger wheels (218) operatively connected to the tugger cart (210); the tugger cart (210) having a front side plurality of transport wheels (220) approximately parallel to, but not touching, ground; the tugger cart (210) having a rear side plurality of transport wheels (222) approximately parallel to, but not touching, the ground; the tugger cart (210) having a first at least one front side loading wheel (224), wherein the first at least one front side loading wheel (224) is closer to the ground than the front side plurality of transport wheels (220) and a second at least one front side loading wheel (274) at an opposite end of the front side plurality of transport wheels (220) from the first at least one front side loading wheel (224); the tugger cart (210) having a first at least one rear side loading wheel (226), wherein the first at least one rear side loading wheel (226) is closer to the ground than the rear side plurality of transport wheels (222) and a second at least one rear side loading wheel (276) at an opposite end of the rear side plurality of transport wheels (222) from the first at least one rear side loading wheel (226); a rider cart (250) having a first end (252) and a second end (254), the rider cart (250) first end (252) and rider cart (250) second end (254) operatively connected by a central portion (256) to define a load carrying area (258); the rider cart (250) having a plurality of rider wheels (260) operatively connected to the rider cart (250); the rider cart (250) first end (252) having a first wing (262) and the first wing (262) having a first wing first curved portion (263) and a first wing second curved portion (273); the rider cart (250) second end (254) having a second wing (264) and the second wing (264) having a second wing first curved portion (265) and a second wing second curved portion (275); and Wherein the first at least one front side loading wheel (224) and the first wing first curved portion (263) can be operatively connected to each other, and the first at least one rear side loading wheel (226) and second wing first curved portion (265) can be operatively connected to each other to allow a user to move the rider cart (250) first wing (262) onto the front side plurality of transport wheels (220) and the rider cart (250) second wing (264) onto the rear side plurality of transport wheels (222), or alternatively, the second at least one front side loading wheel (274) and the first wing second curved portion (273) can be operatively connected to each other, and the second at least one rear side loading wheel (276) and second wing second curved portion (275) can be operatively connected to each other to allow a user to move the rider cart (250) first wing (262) onto the front side plurality of transport wheels (220) and the rider cart (250) second wing (264) onto the rear side plurality of transport wheels (222) such that when the rider cart (250) first wing (262) is on the front side plurality of transport wheels (220) and the rider cart (250) second wing (264) is on the rear side plurality of transport wheels (222) the plurality of rider wheels (260) are off of the ground and the plurality of tugger wheels (218) support both the tugger cart (210) and the rider cart (250) to allow the tugger cart (210) to transport the rider cart (250).

In another embodiment, the central portion (216) can include a front sidewall (281) and a rear sidewall (282). The front sidewall (281) has an outer surface facing the front side (212) and the rear sidewall (282) has an outer surface facing the rear side (214). Each of the front side plurality of transport wheels (220) are coupled to the outer surface of the front sidewall (281) by respective front side axles (284) and each of the rear side plurality of transport wheels (222) are coupled to the outer surface of the rear sidewall (282) by rear side axles (286). The first at least one front side loading wheel (224) is coupled to the outer surface of the front sidewall (281) by a first front side loading, axle (288) at a fixed position closer to the ground than is the front side plurality of transport wheels (220). The second at least one front side loading wheel (274) is coupled to the outer surface of the front sidewall (281) by a second front side loading axle (292) at a fixed position closer to the ground than is the front side plurality of transport wheels (220). The first at least one rear side loading wheel (226) is coupled to the outer surface of the rear sidewall (282) by a first rear side loading axle (290) at a fixed position closer to the ground than is the rear side plurality of transport wheels (222). The second at least one rear side loading wheel (276) is coupled to the outer surface of the rear sidewall (282) by a second rear side loading axle (294) at a fixed position closer to the ground than is the rear side plurality of transport wheels (222).

In another embodiment the improved tugger and rider cart assembly (200) wherein the improved tugger and rider cart assembly (200) further comprises a locking mechanism (280) to secure the rider cart (250) to the tugger cart (210) after loading the rider cart (250) onto the tugger cart (210).

In still another embodiment an improved tugger and rider cart assembly (200) comprising: a tugger cart (210) having a front side (212) and a rear side (214), the tugger cart (210) front side (212) and the tugger cart (210) rear side (214) operatively connected by a central portion (216) to define a central space wherein the central space is dimensioned to receive a rider cart (250); the tugger cart (210) having a plurality of tugger wheels (218) operatively connected to the tugger cart (210); the tugger cart (210) having a front side plurality of transport wheels (220) approximately parallel to, but not touching, ground; the tugger cart (210) having a rear side plurality of transport wheels (222) approximately parallel to, but not touching, the ground; the tugger cart (210) having a first at least one front side loading wheel (224), wherein the first at least one front side loading wheel (224) is closer to the ground than the front side plurality of transport wheels (220) and a second at least one front side loading wheel (274) at an opposite end of the front side plurality of transport wheels (220) from the first at least one front side loading wheel (224); the tugger cart (210) having a first at least one rear side loading wheel (226), wherein the first at least one rear side loading wheel (226) is closer to the ground than the rear side plurality of transport wheels (222) and a second at least one rear side loading wheel (276) at an opposite end of the rear side plurality of transport wheels (222) from the first at least one rear side loading wheel (226); a rider cart (250) having a first end (252) and a second end (254), the rider cart (250) first end (252) and rider cart (250) second end (254) operatively connected by a central portion (256) to define a load carrying area (258); the rider cart (250) having a plurality of rider wheels (260) operatively connected to the rider cart (250); the rider cart (250) first end (252) having a first wing (262) and the first wing (262) having a first wing first curved portion (263) and a first wing second curved portion (273); the rider cart (250) second end (254) having a second wing (264) and the second wing (264) having a second wing first curved portion (265) and a second wing second curved portion (275); wherein the first at least one front side loading wheel (224) and the first wing first curved portion (263) can be operatively connected to each other, and the first at least one rear side loading wheel (226) and second wing first curved portion (265) can be operatively connected to each other to allow a user to move the rider cart (250) first wing (262) onto the front side plurality of transport wheels (220) and the rider cart (250) second wing (264) onto the rear side plurality of transport wheels (222), or alternatively, the second at least one front side loading wheel (274) and the first wing second curved portion (273) can be operatively connected to each other, and the second at least one rear side loading wheel (276) and second wing second curved portion (275) can be operatively connected to each other to allow a user to move the rider cart (250) first wing (262) onto the front side plurality of transport wheels (220) and the rider cart (250) second wing (264) onto the rear side plurality of transport wheels (222) such that when the rider cart (250) first wing (262) is on the front side plurality of transport wheels (220) and the rider cart (250) second wing (264) is on the rear side plurality of transport wheels (222) the plurality of rider wheels (260) are off of the ground and the plurality of tugger wheels (218) support both the tugger cart (210) and the rider cart (250) to allow the tugger cart (210) to transport the rider cart (250); and a locking mechanism (280) to secure the rider cart (250) to the tugger cart (210) after loading the rider cart (250) onto the tugger cart (210).

Figure 3:
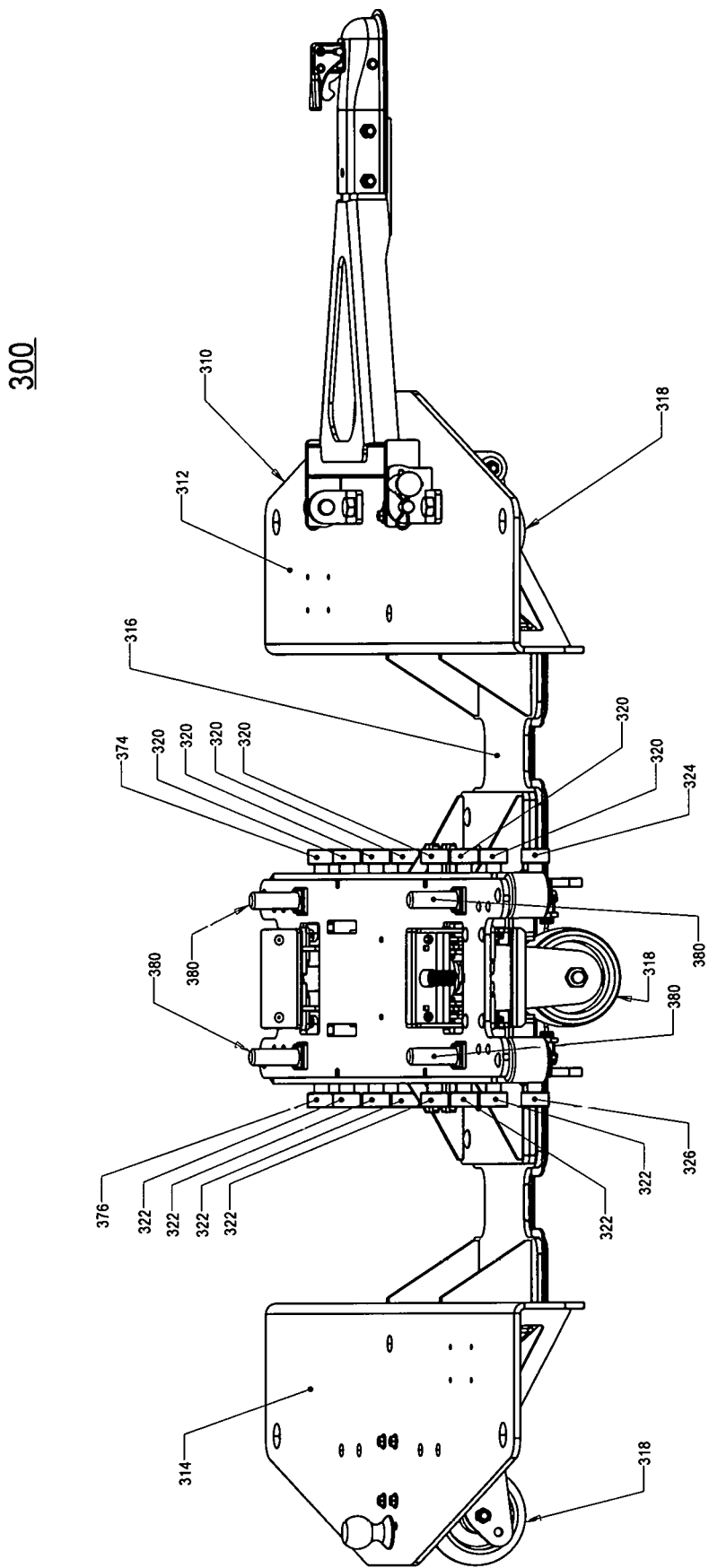
FIG. 3 is a perspective view of a tugger cart according to an embodiment.

Turning now to FIG. 3 which shows an embodiment of an improved tugger cart (300) comprising: a tugger cart (310) having a front side (312) and a rear side (314), the tugger cart (310) front side (312) and the tugger cart (310) rear side (314) operatively connected by a central portion (316) to define a central space wherein the central space is dimensioned to receive a rider cart (350); the tugger cart (310) having a plurality of tugger wheels (318) operatively connected to the tugger cart (310); the tugger cart (310) having a front side plurality of transport wheels (320) approximately parallel to, but not touching, ground; the tugger cart (310) having a rear side plurality of transport wheels (322) approximately parallel to, but not touching, the ground; the tugger cart (310) having a first at least one front side loading wheel (324), wherein the first at least one front side loading wheel (324) is closer to the ground than the front side plurality of transport wheels (320) and a second at least one front side loading wheel (374) at an opposite end of the front side plurality of transport wheels (320) from the first at least one front side loading wheel (324); the tugger cart (310) having a first at least one rear side loading wheel (326), wherein the first at least one rear side loading wheel (326) is closer to the ground than the rear side plurality of transport wheels (322) and a second at least one rear side loading wheel (376) at an opposite end of the rear side plurality of transport wheels (322) from the first at least one rear side loading wheel (326); and a locking mechanism (380) to secure the rider cart (not shown, see FIG. 4) to the tugger cart (310) after loading the rider cart (not shown, see FIG. 4) onto the tugger cart (310).

Figure 4:
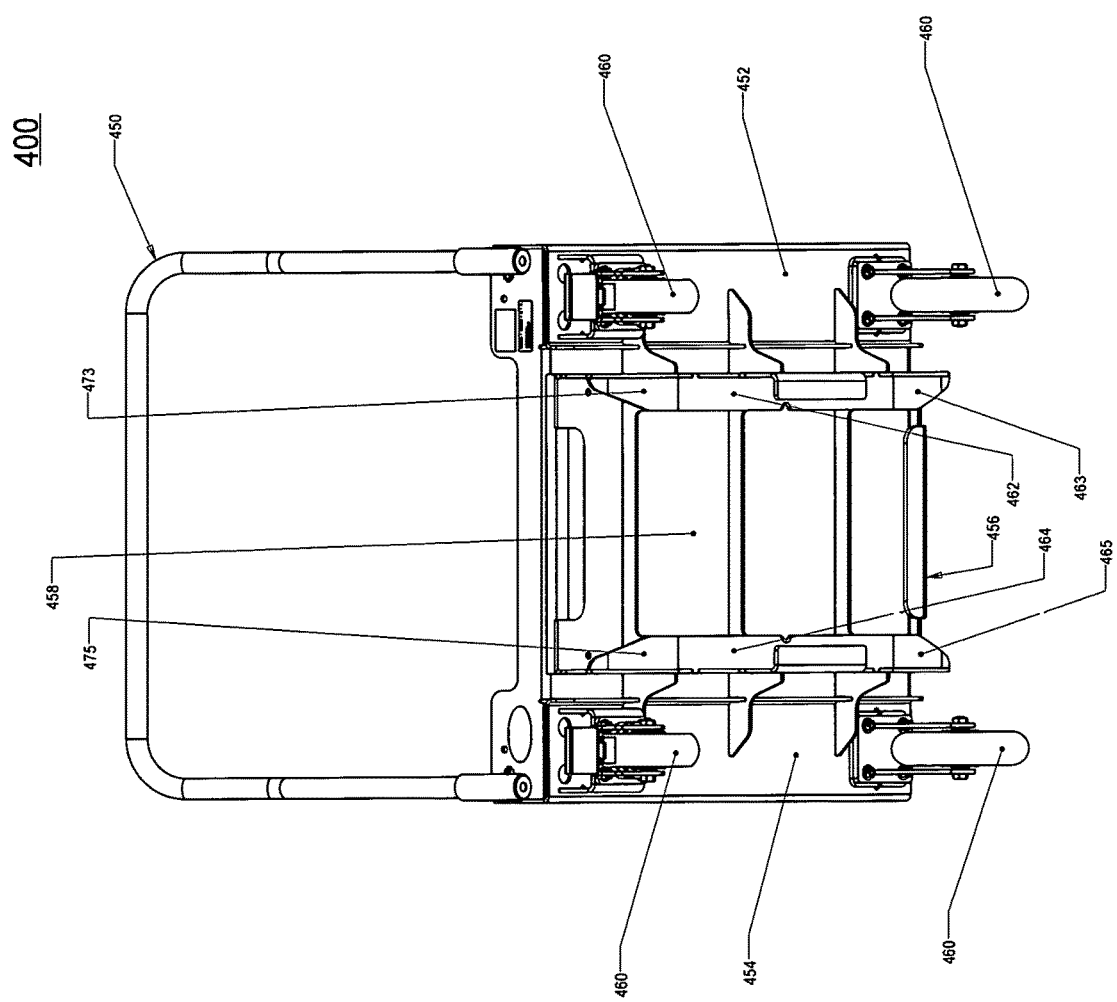
FIG. 4 is a perspective view of a rider cart according to an embodiment.
Figure 5A:
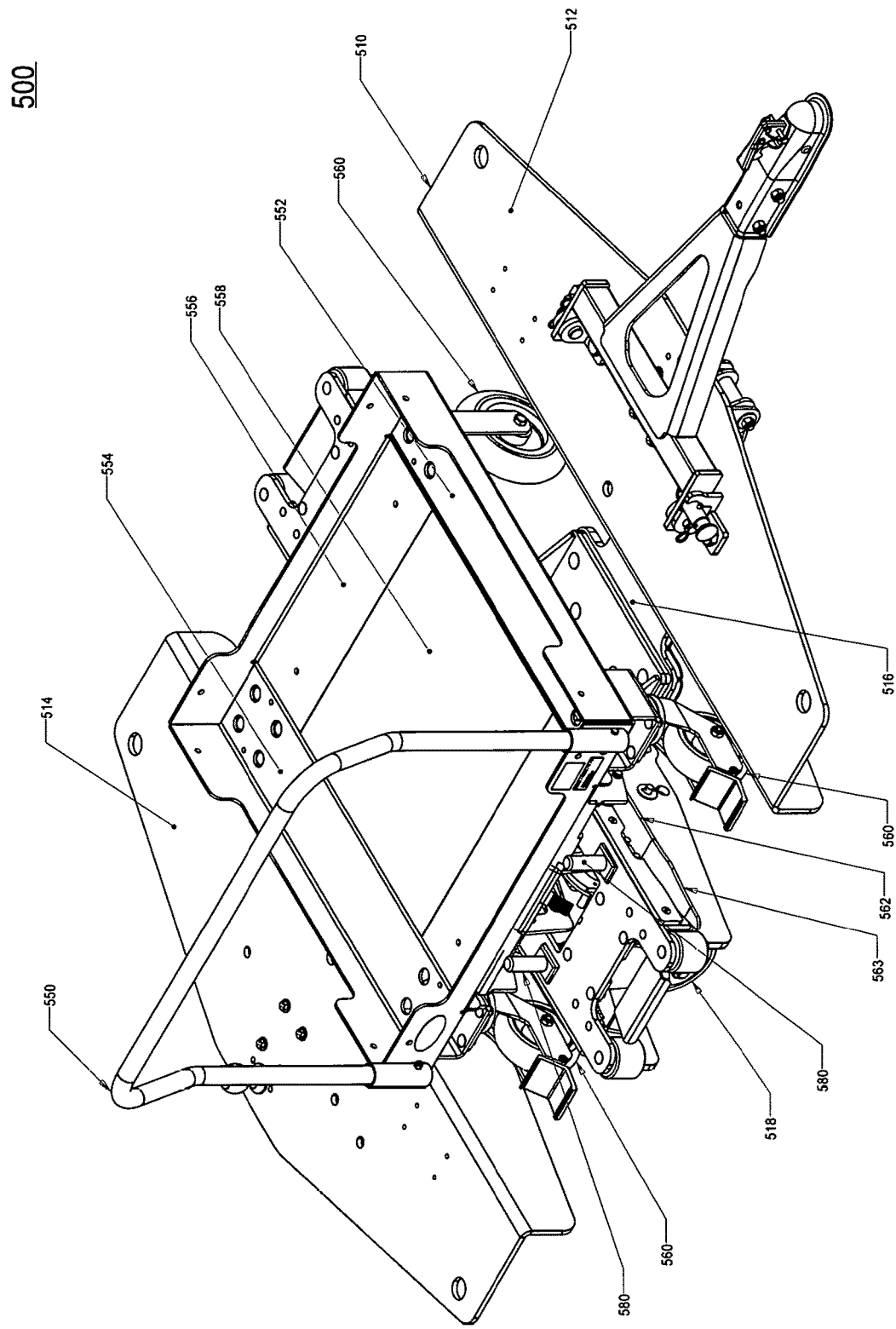
FIG. 5A is a perspective view of a tugger and rider cart assembly according to an embodiment.
Figure 5B:
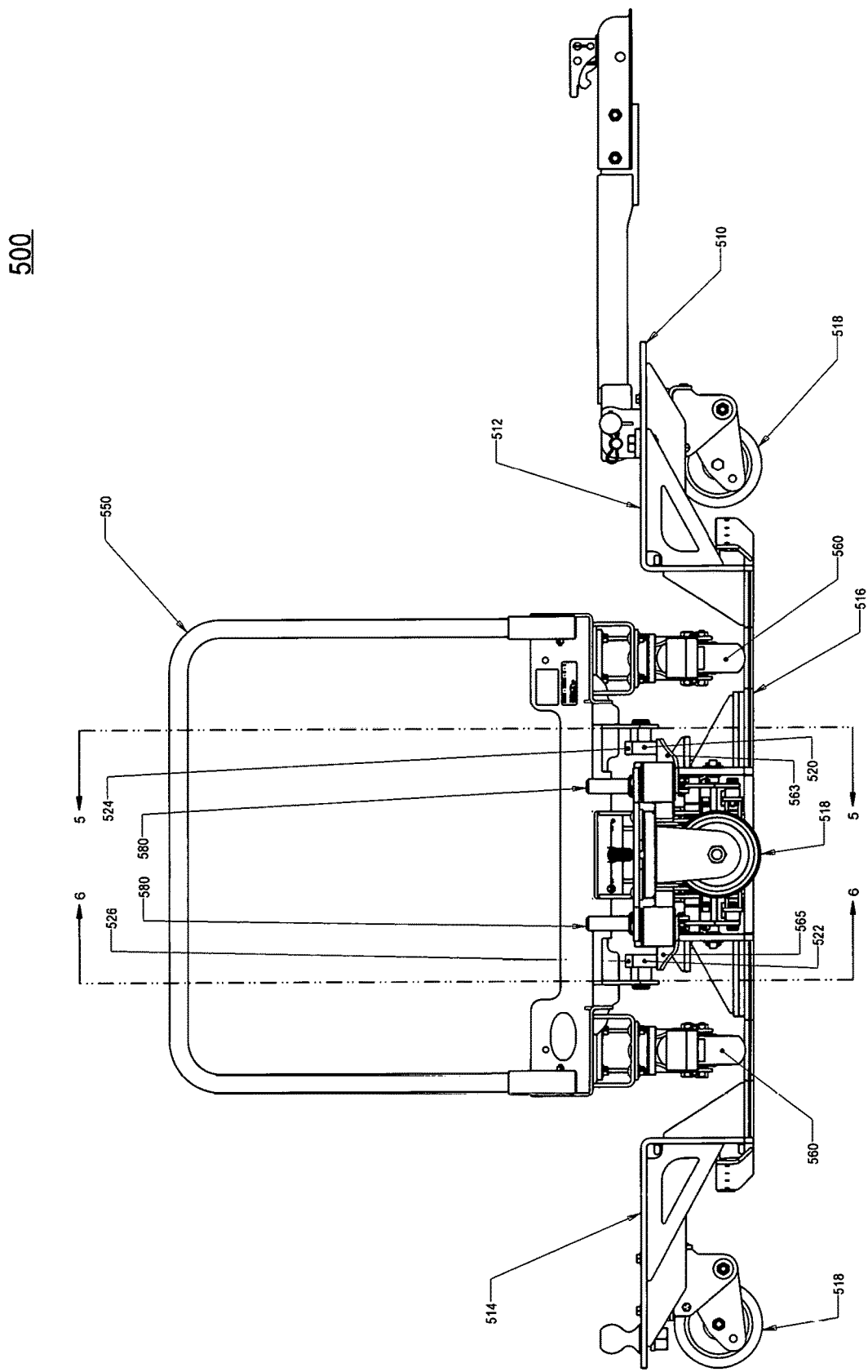
FIG. 5B is a side view of a tugger cart assembly according to an embodiment.
Figure 5D:
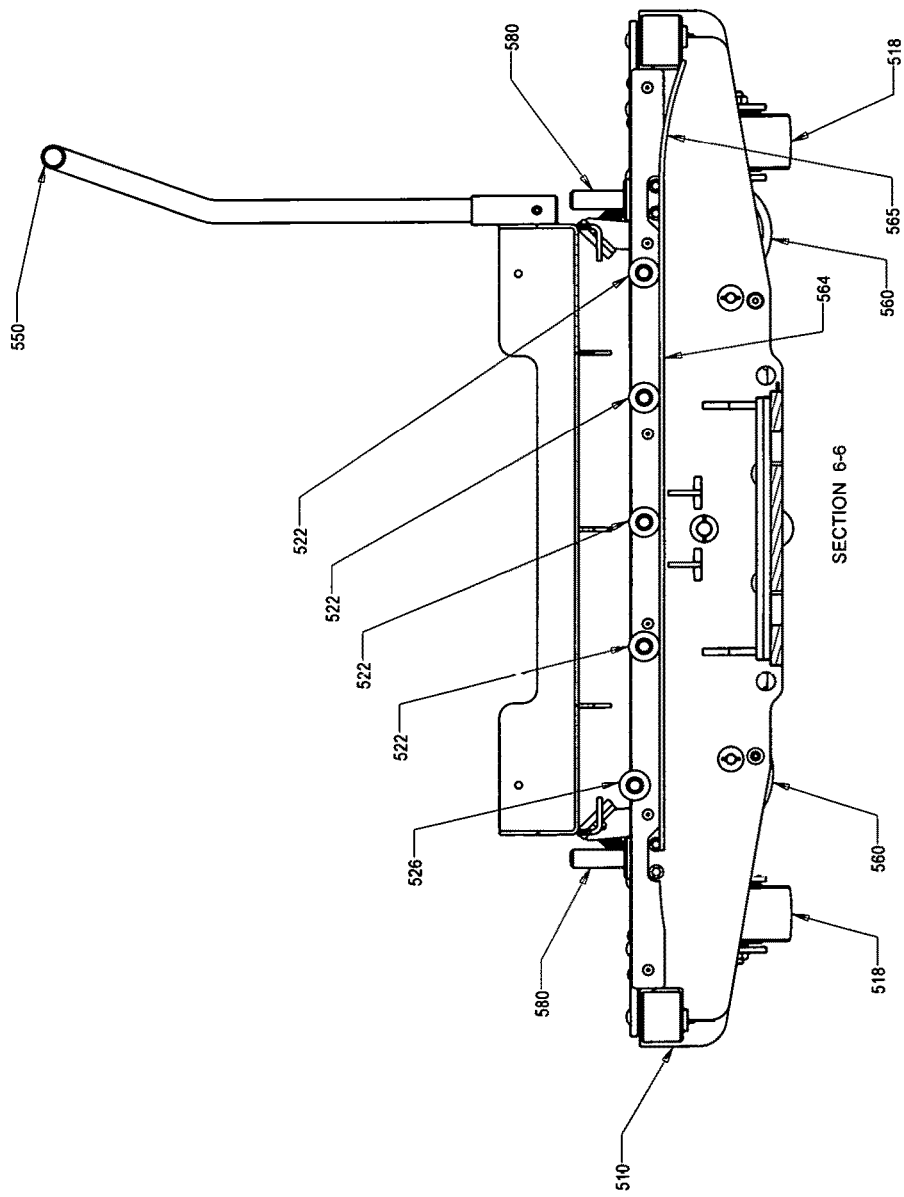
FIG. 5D is a cross-sectional rear view of a tugger cart assembly taken along lines 6-6 of FIG. 5B.
Figure 5E:
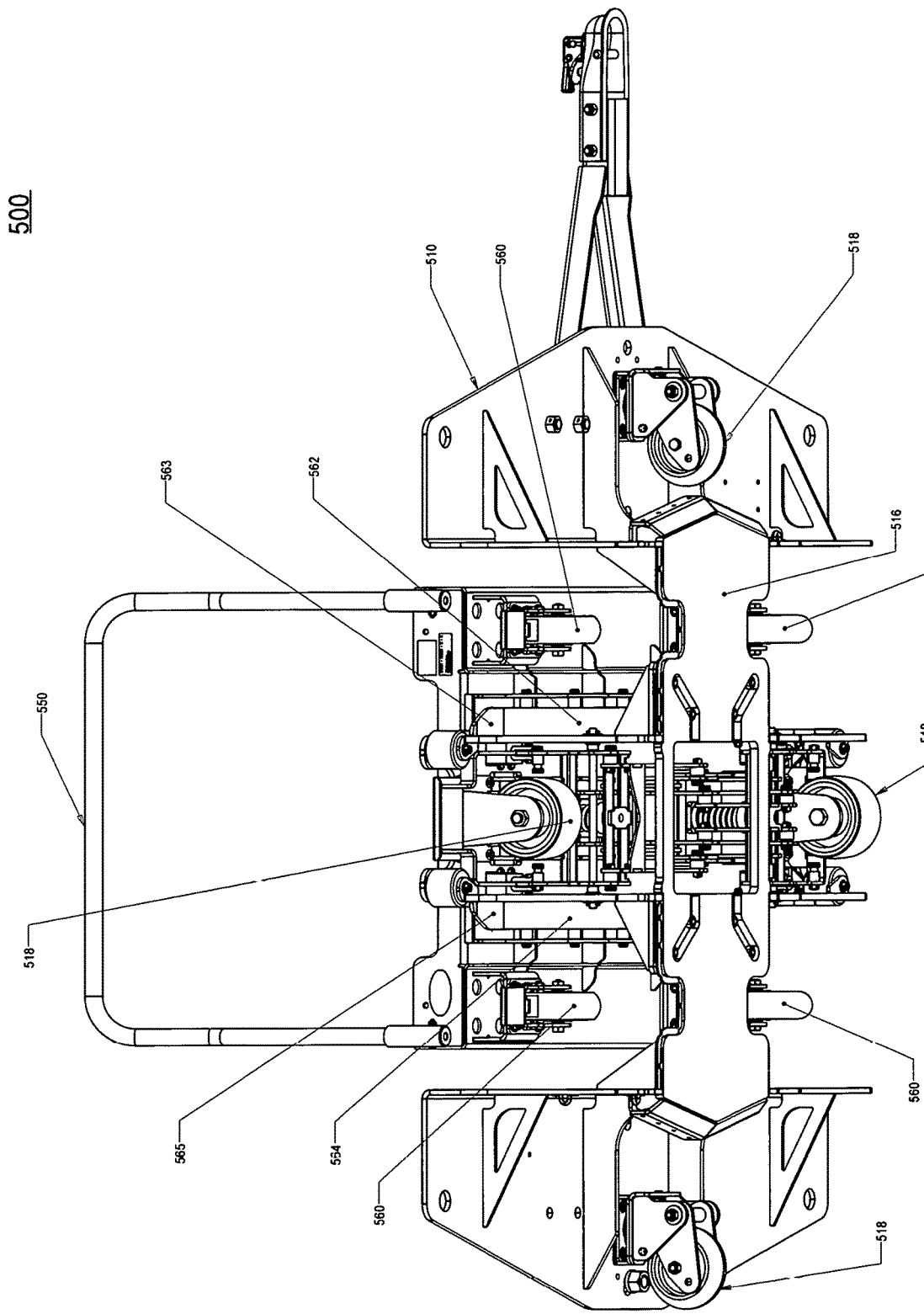
FIG. 5E is a perspective view of a tugger and rider cart assembly according to an embodiment.
Figure 6A:
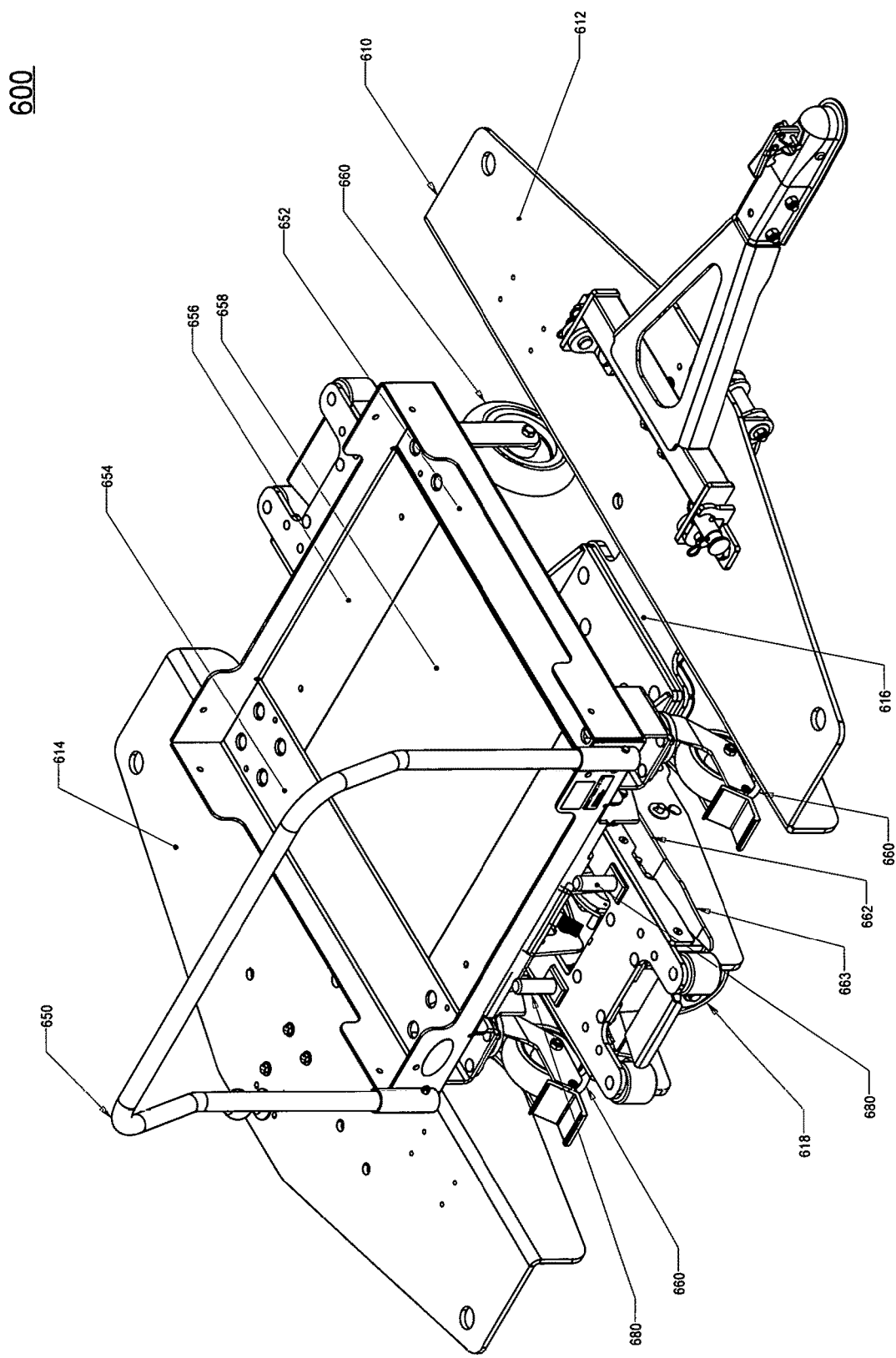
FIG. 6A is a perspective view of a tugger and rider cart assembly according to an embodiment.
Figure 6B:
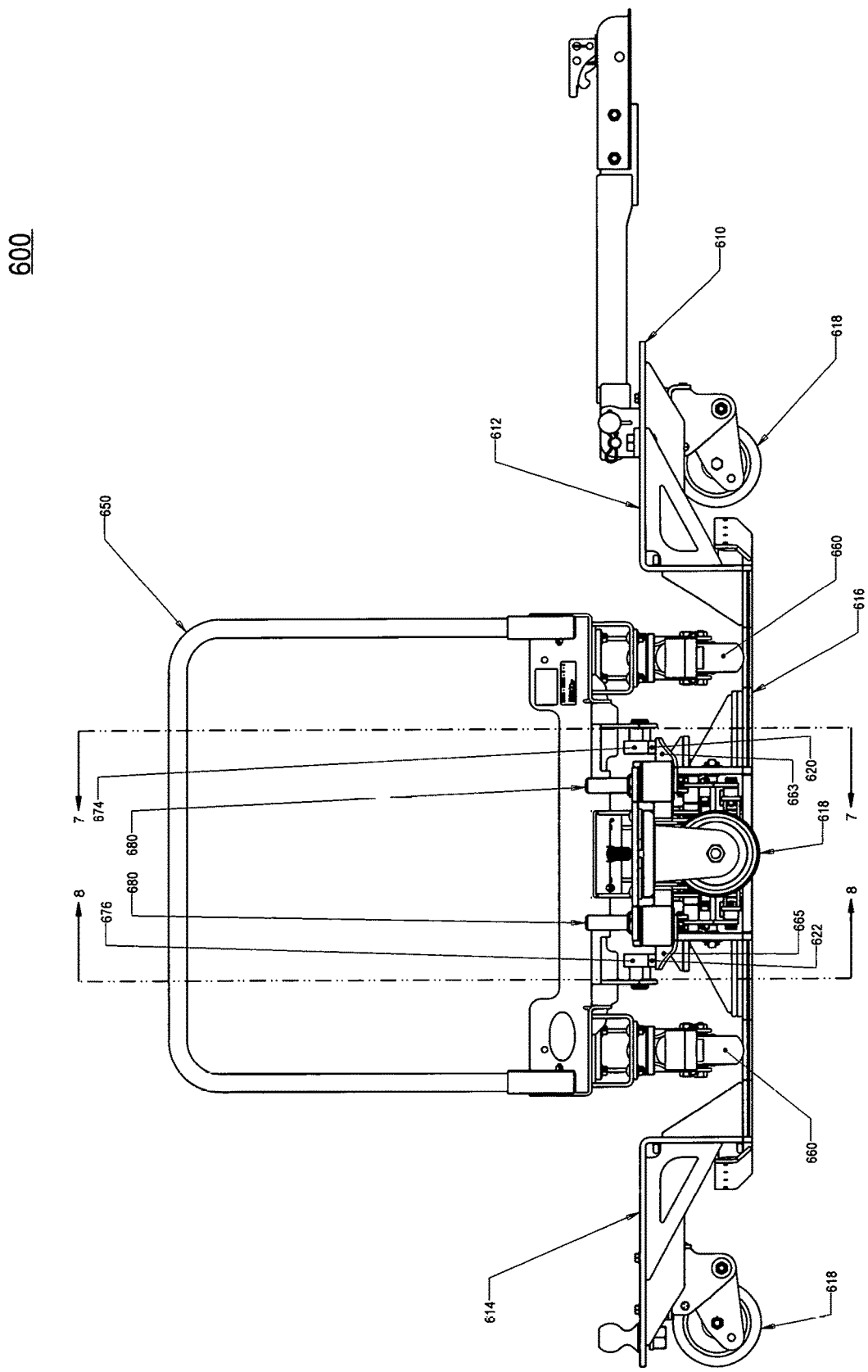
FIG. 6B is a side view of a tugger cart assembly according to an embodiment.
Figure 6C:
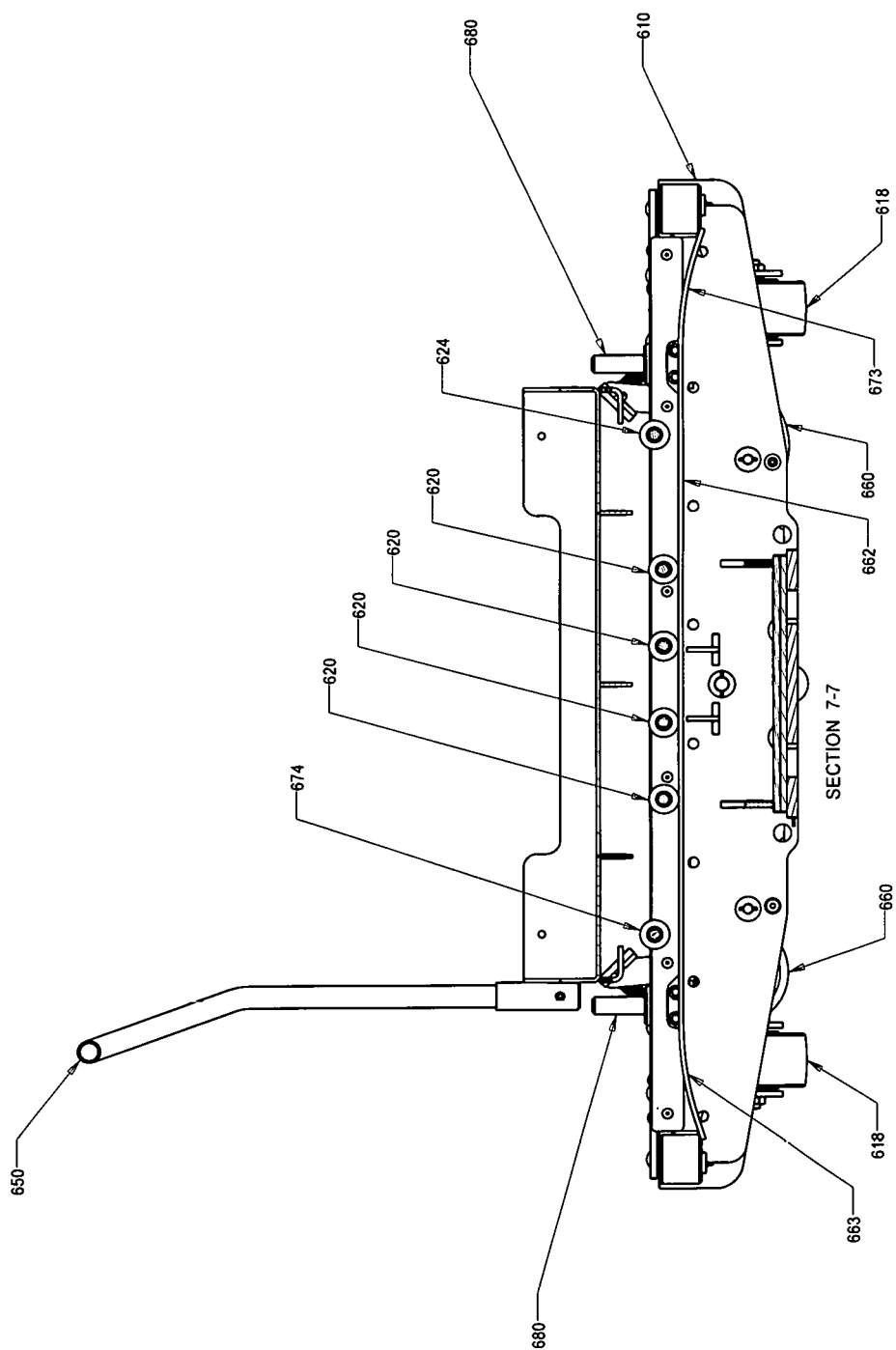
FIG. 6C is a cross-sectional front view of a tugger cart assembly taken along lines 7-7 of FIG. 6B.
Figure 6D:
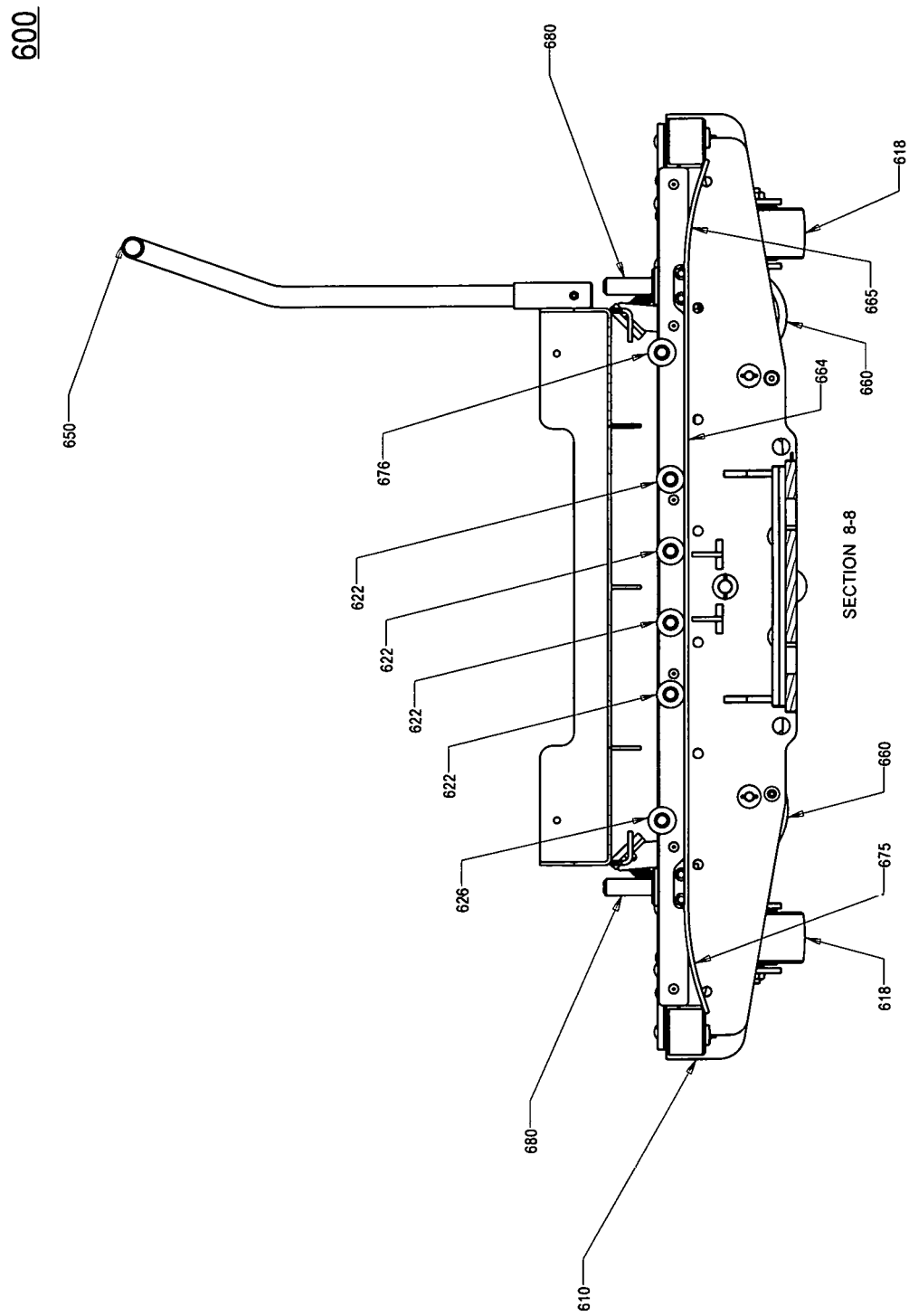
FIG. 6D is a cross-sectional rear view of a tugger cart assembly taken along lines 8-8 of FIG. 6B.
Figure 6E:
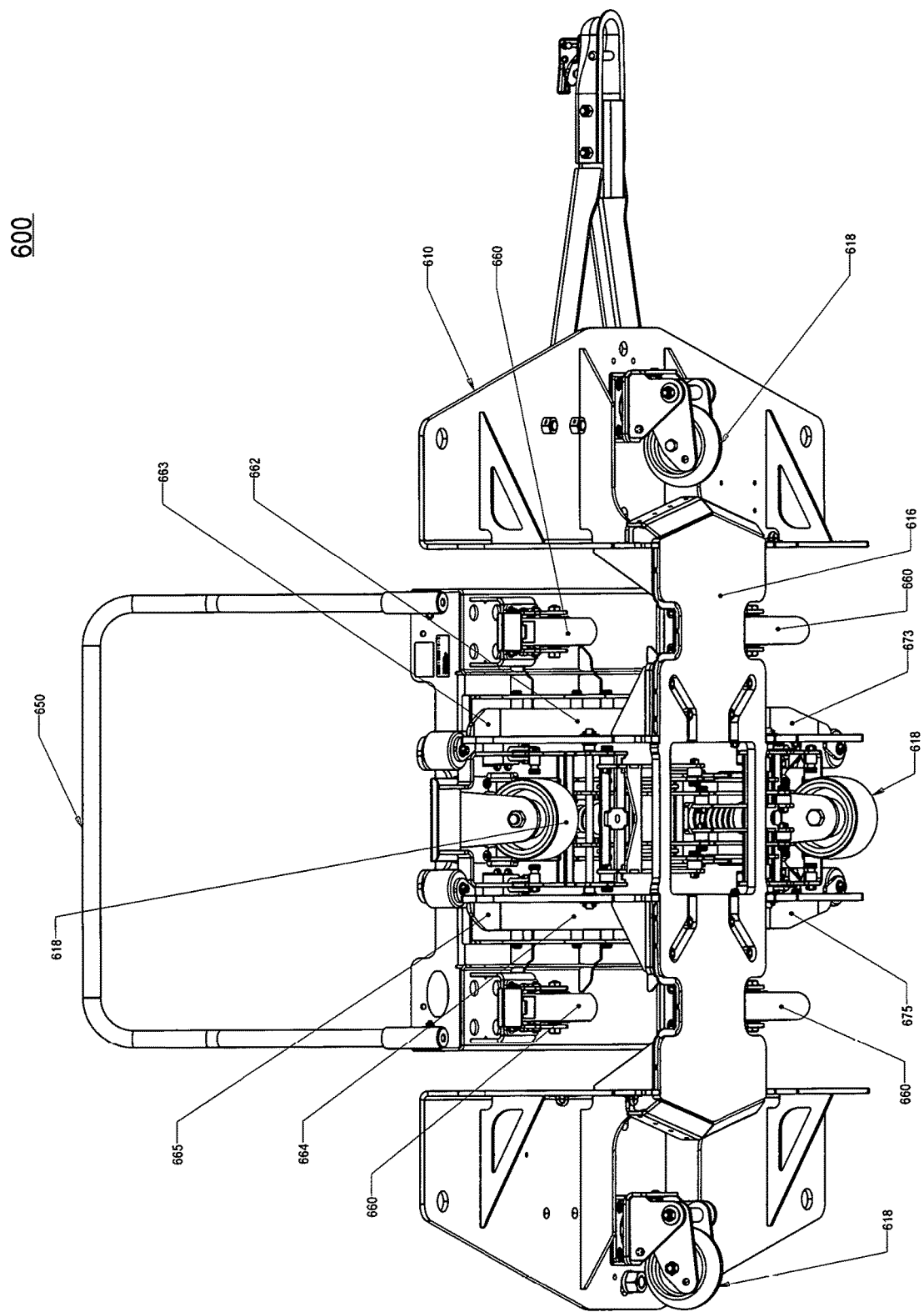
FIG. 6E is a perspective view of a tugger and rider cart assembly according to an embodiment.
Figure 7A:
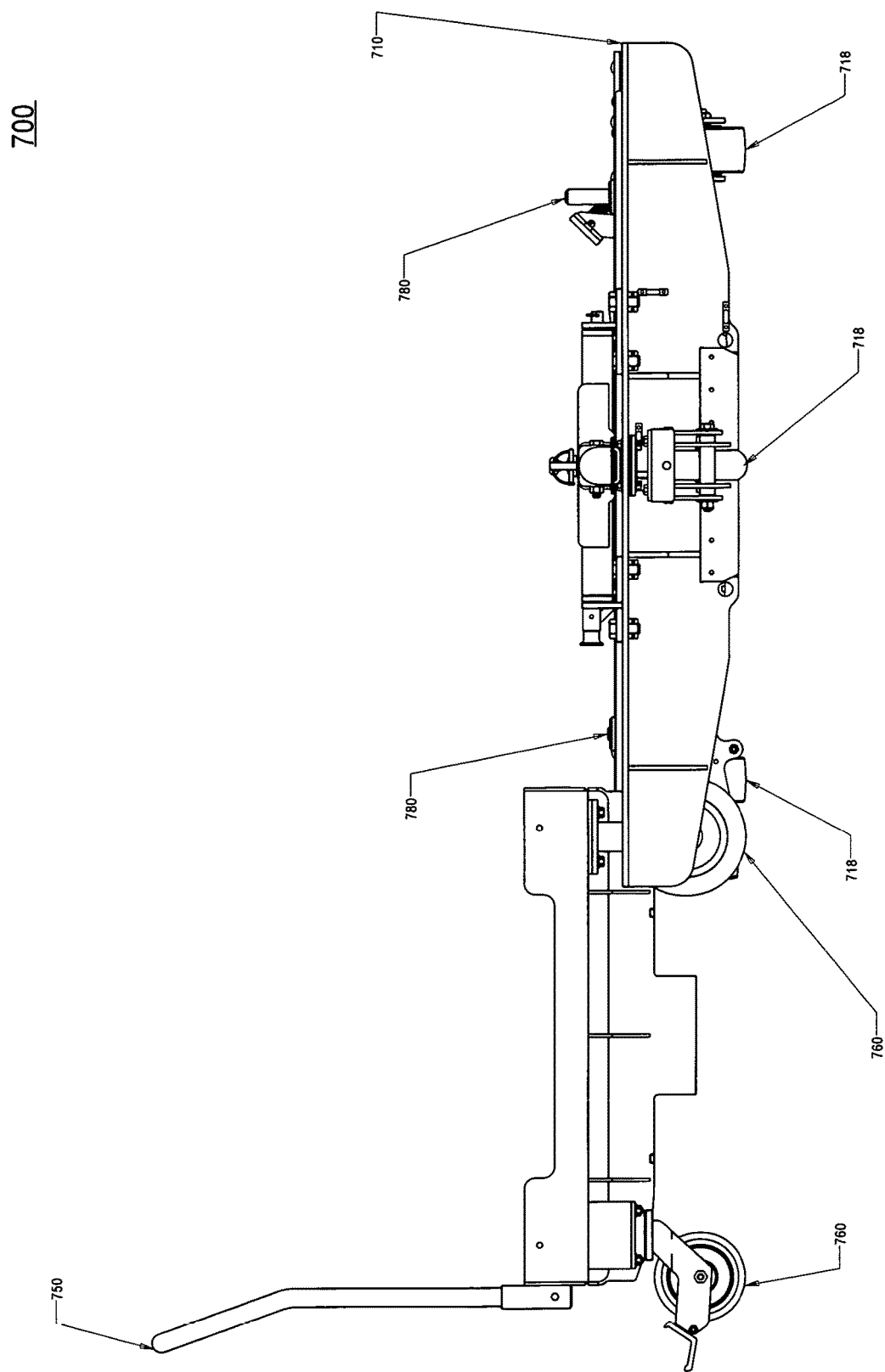
FIG. 7A is a front view of a tugger cart assembly preparing to load a rider cart onto a tugger cart according to an embodiment.
Figure 7B:
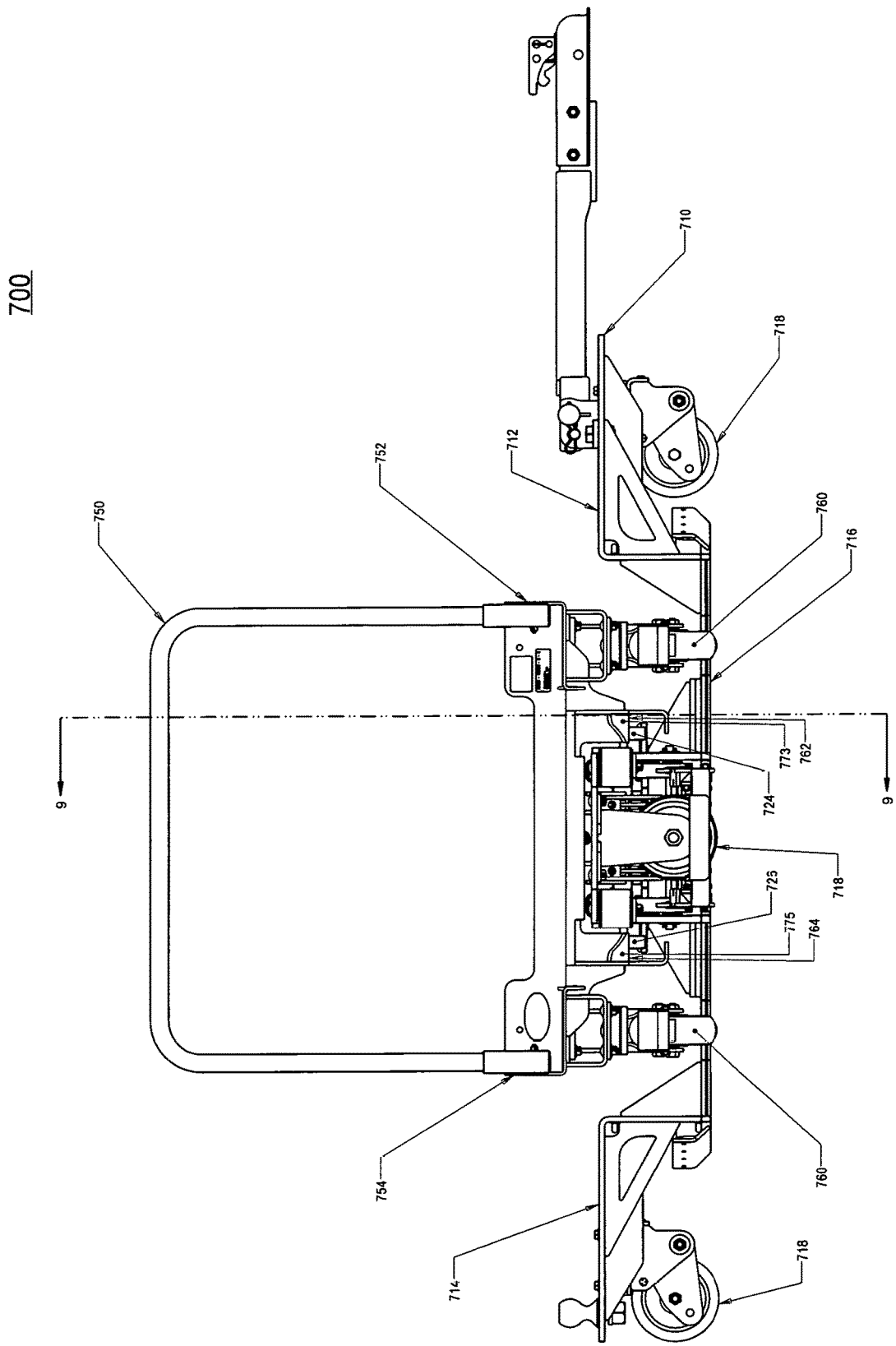
FIG. 7B is a side view of a tugger cart assembly preparing to load a rider cart onto a tugger cart according to an embodiment.
Figure 7C:
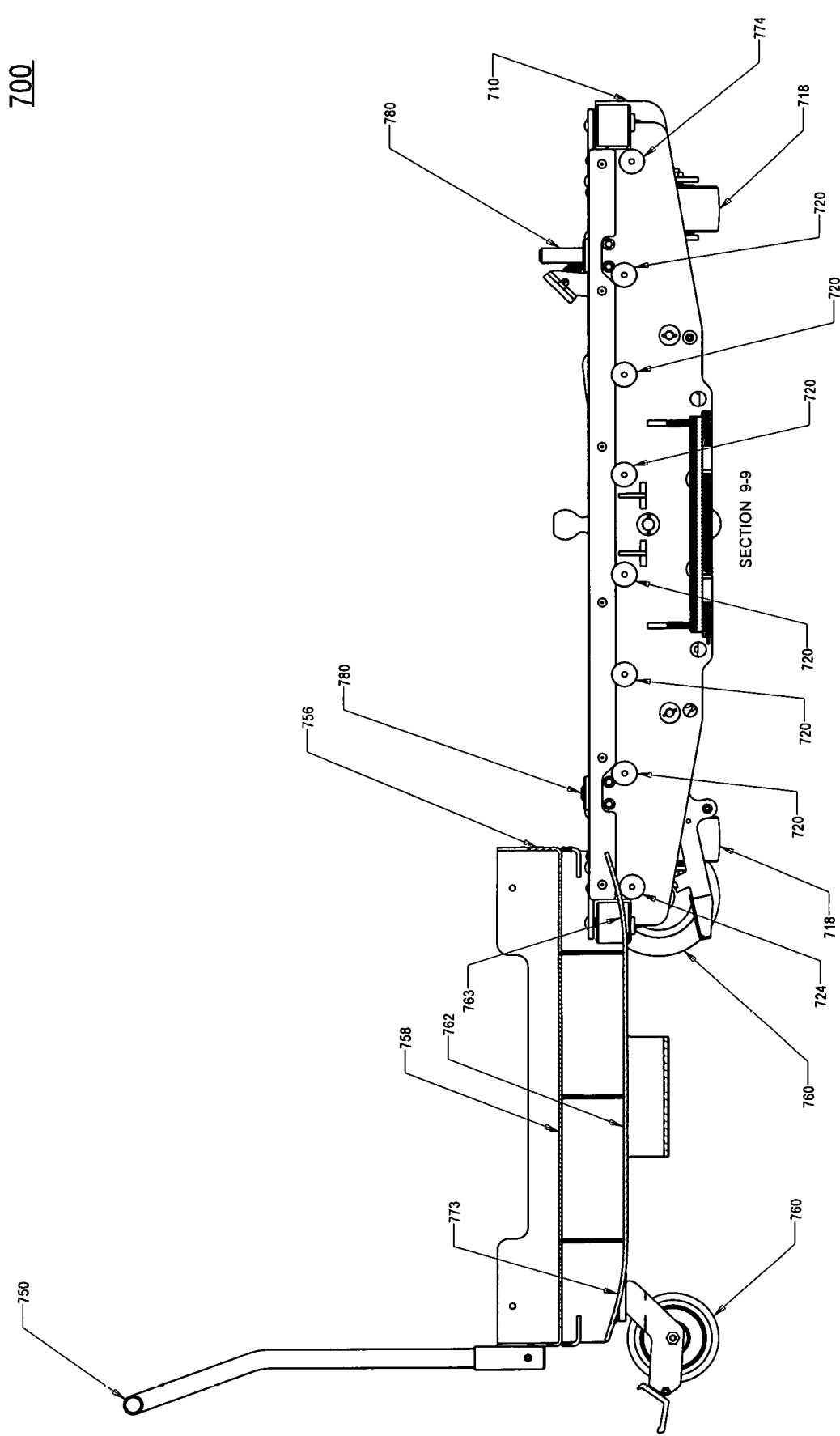
FIG. 7C is a cross-sectional front view of the a tugger cart assembly preparing to load a rider cart onto a tugger cart taken along lines 9-9 of FIG. 7B.
Figure 7D:
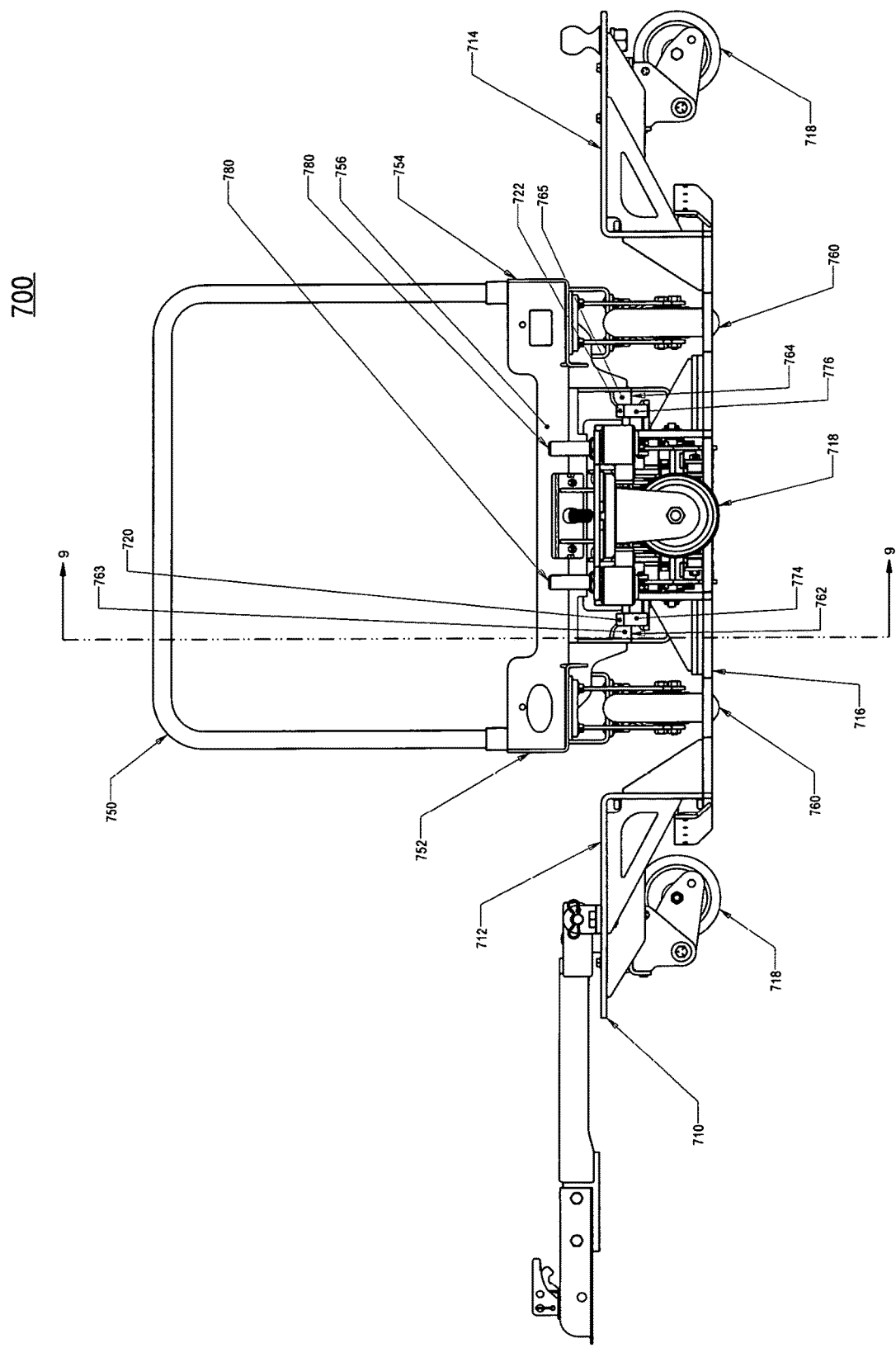
FIG. 7D is the opposite side view of FIG. 7B of a tugger cart assembly preparing to load a rider cart onto a tugger cart according to an embodiment.
Figure 8A:
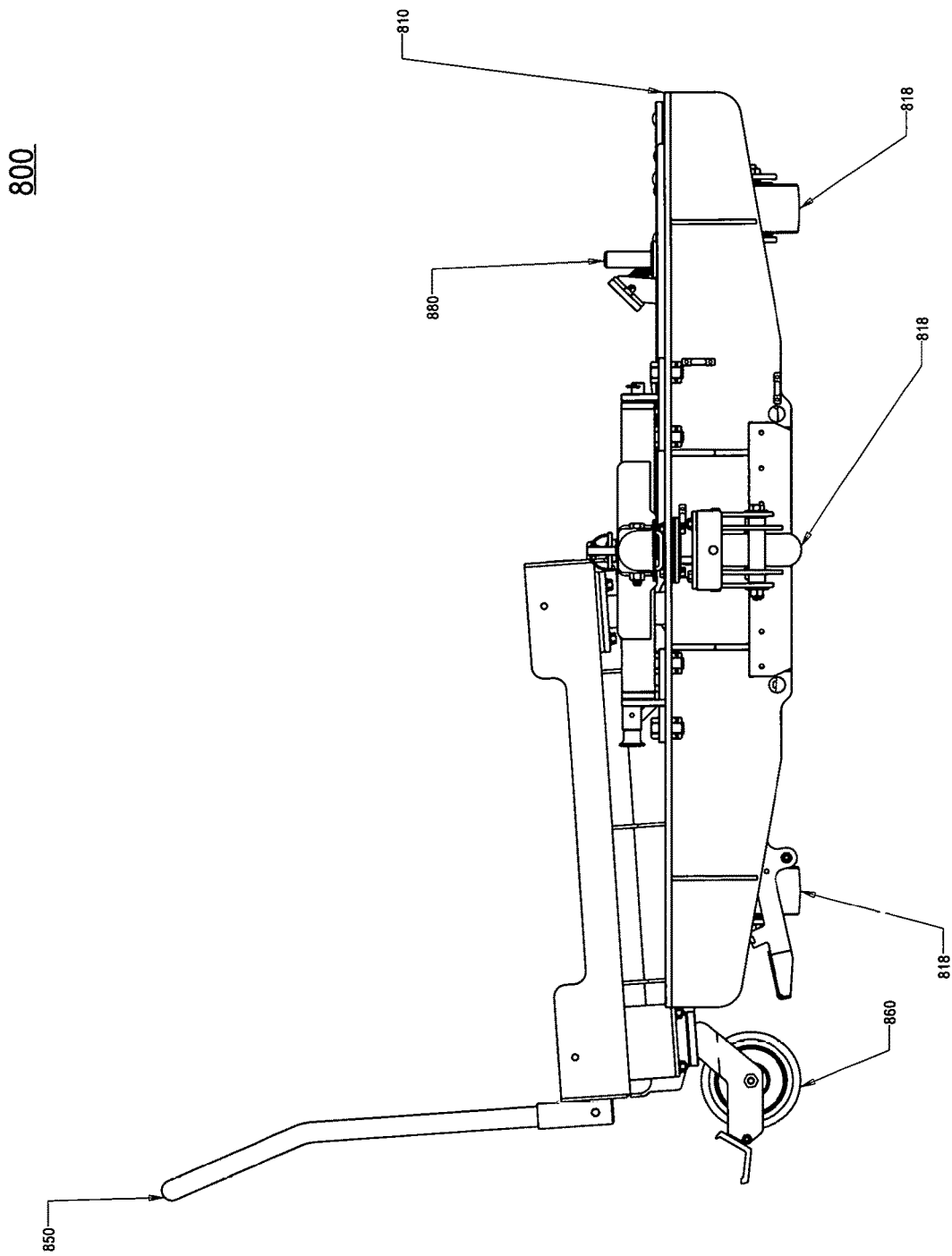
FIG. 8A is a front view of a tugger cart assembly loading a rider cart onto a tugger cart according to an embodiment.
Figure 8B:
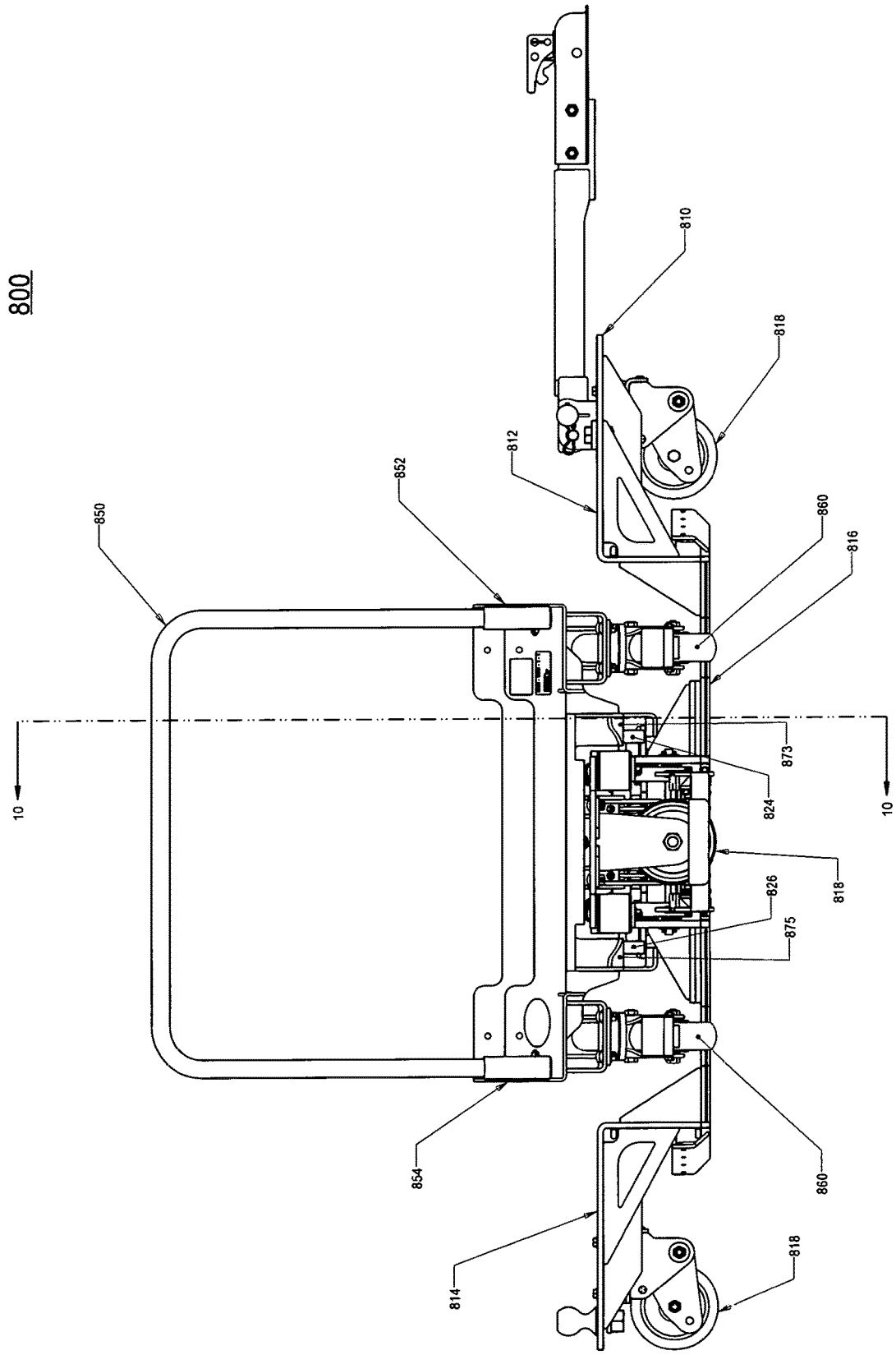
FIG. 8B is a side view of a tugger cart assembly loading a rider cart onto a tugger cart according to an embodiment.
Figure 8C:
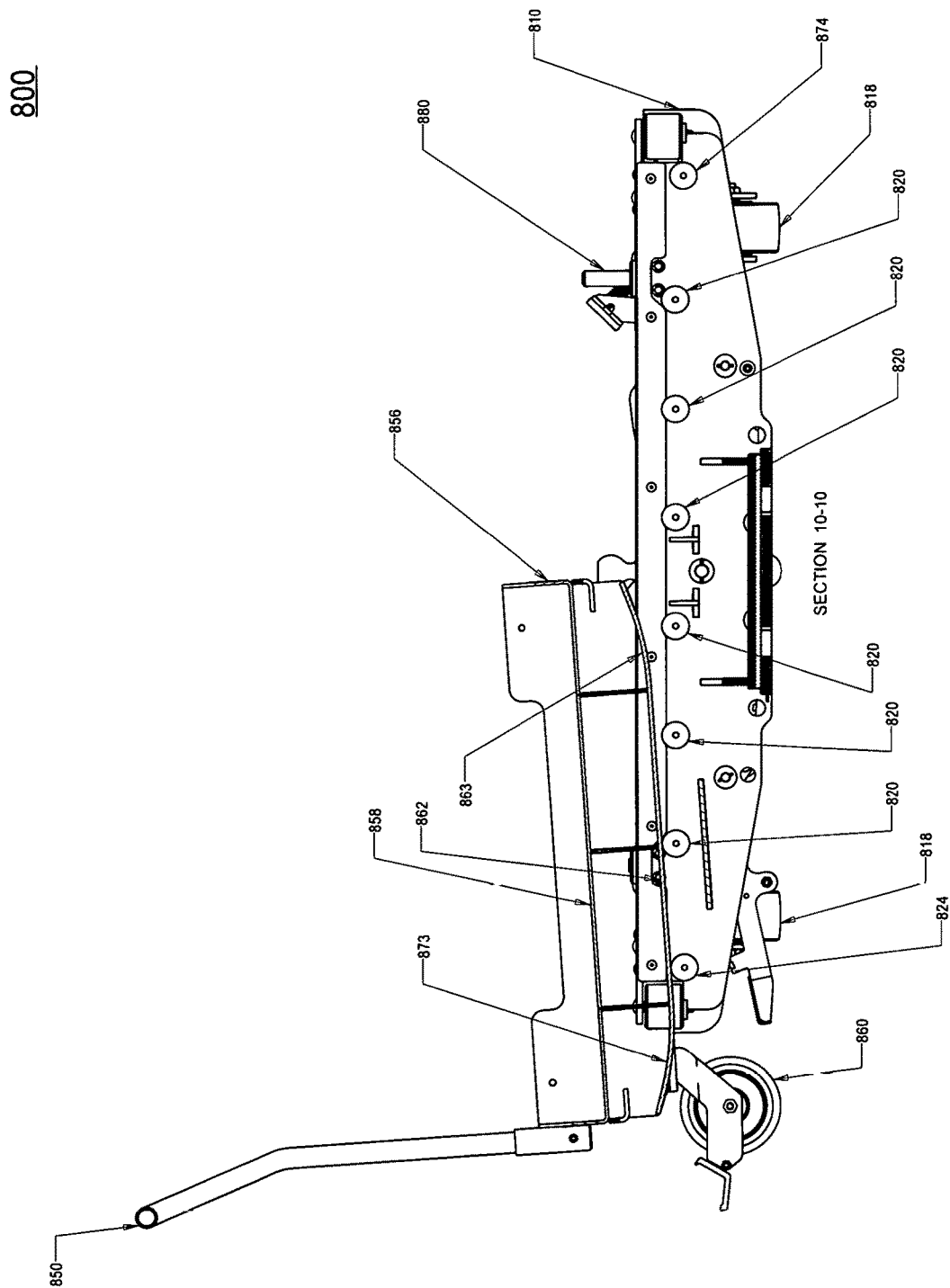
FIG. 8C is a cross-sectional front view of the a tugger cart assembly loading a rider cart onto a tugger cart taken along lines 10-10 of FIG. 8B.
Figure 8D:
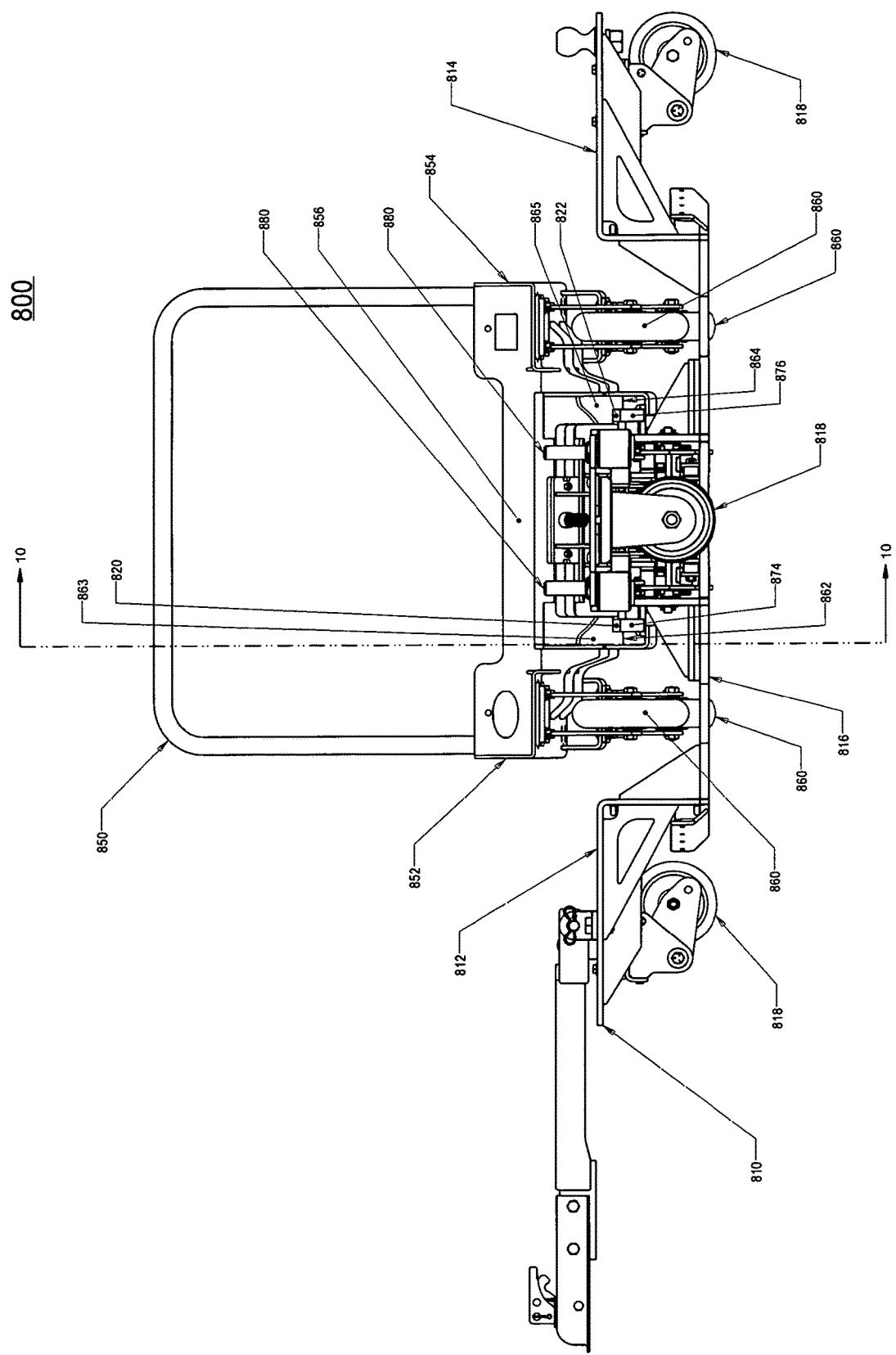
FIG. 8D is the opposite side view of FIG. 8B of a tugger cart assembly loading a rider cart onto a tugger cart according to an embodiment.
Figure 9A:
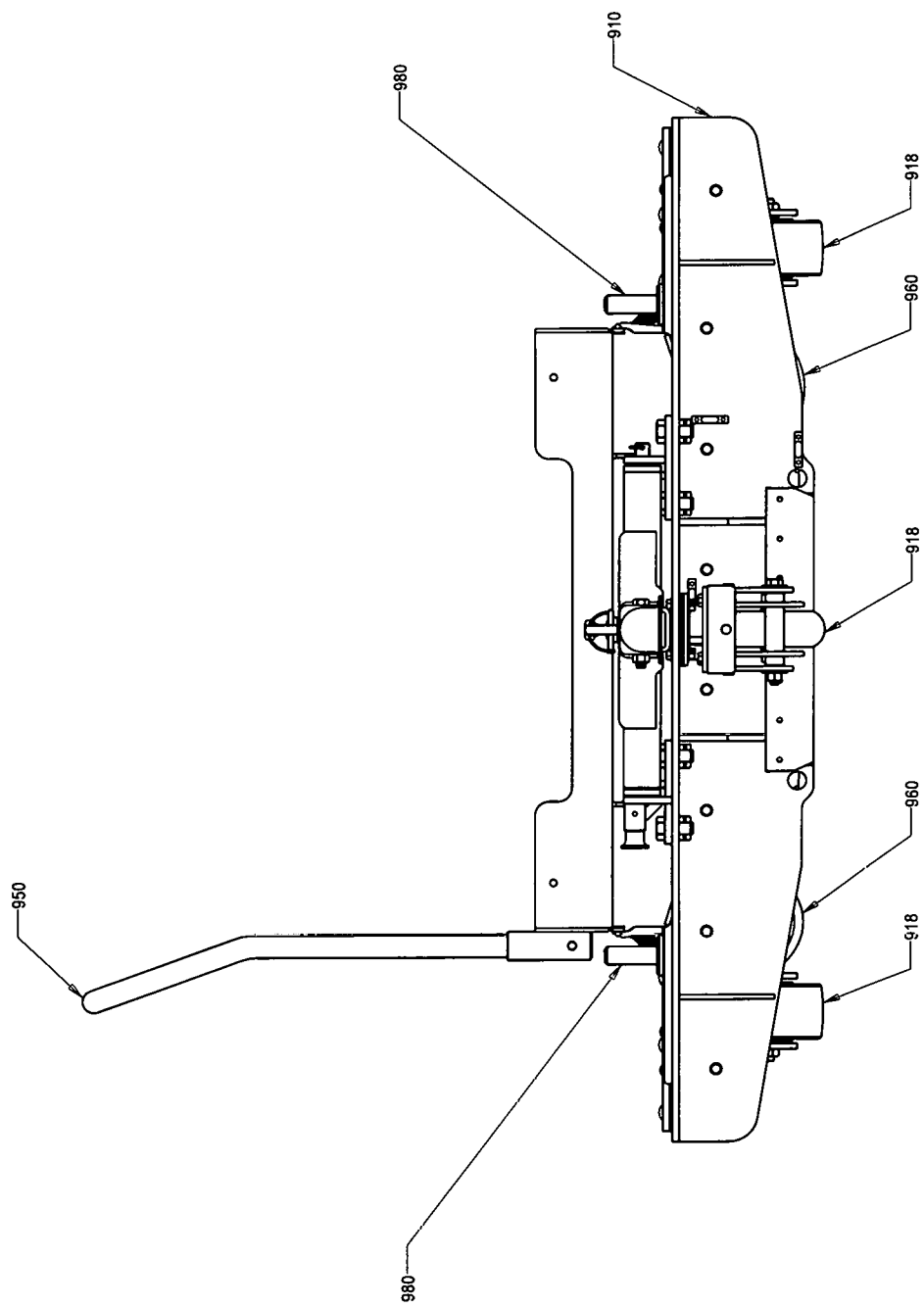
FIG. 9A is a front view of a tugger cart assembly preparing to load a rider cart onto a tugger cart according to an embodiment.
Figure 9B:
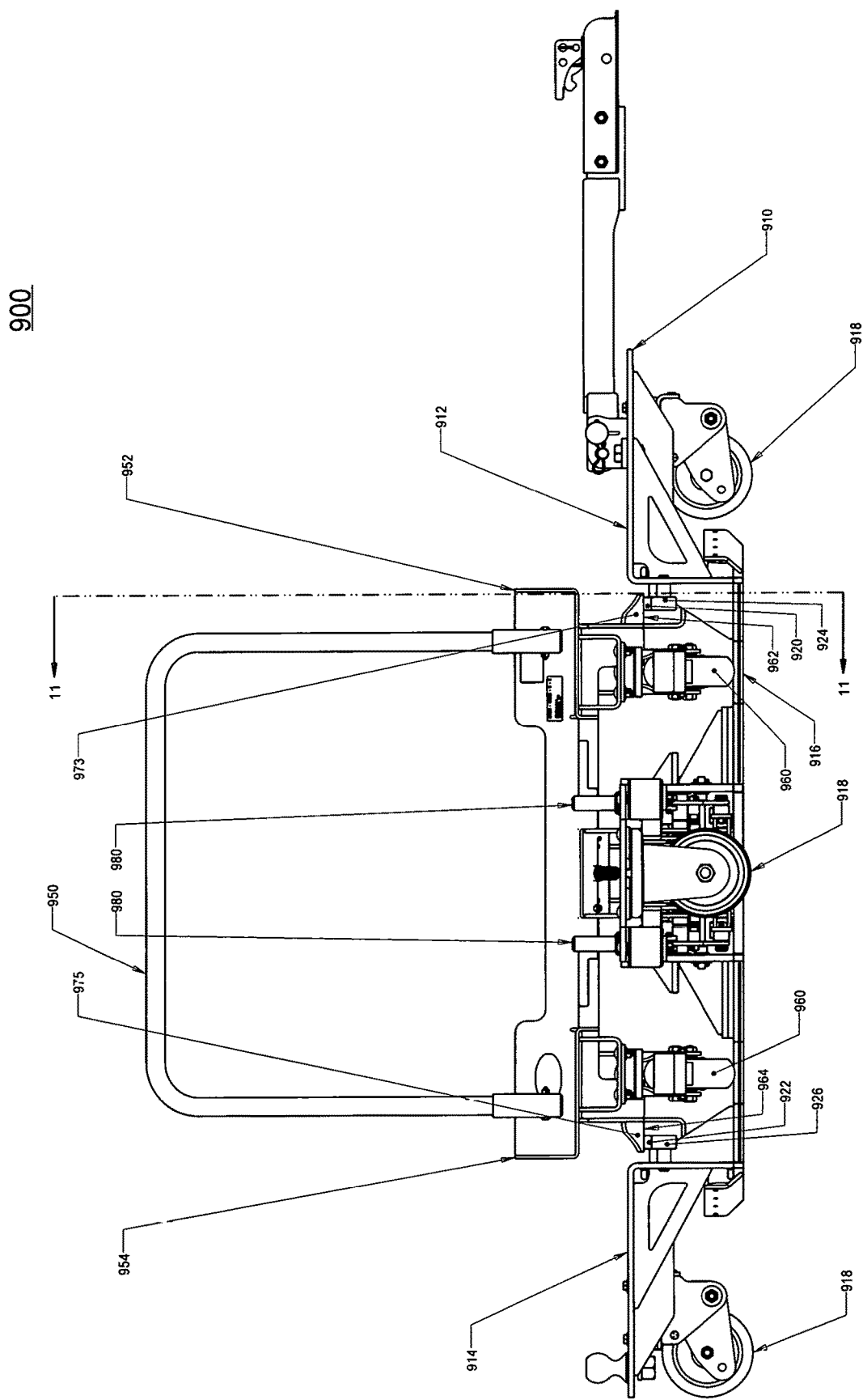
FIG. 9B is a side view of a tugger cart assembly preparing to load a rider cart onto a tugger cart according to an embodiment.
Figure 9C:
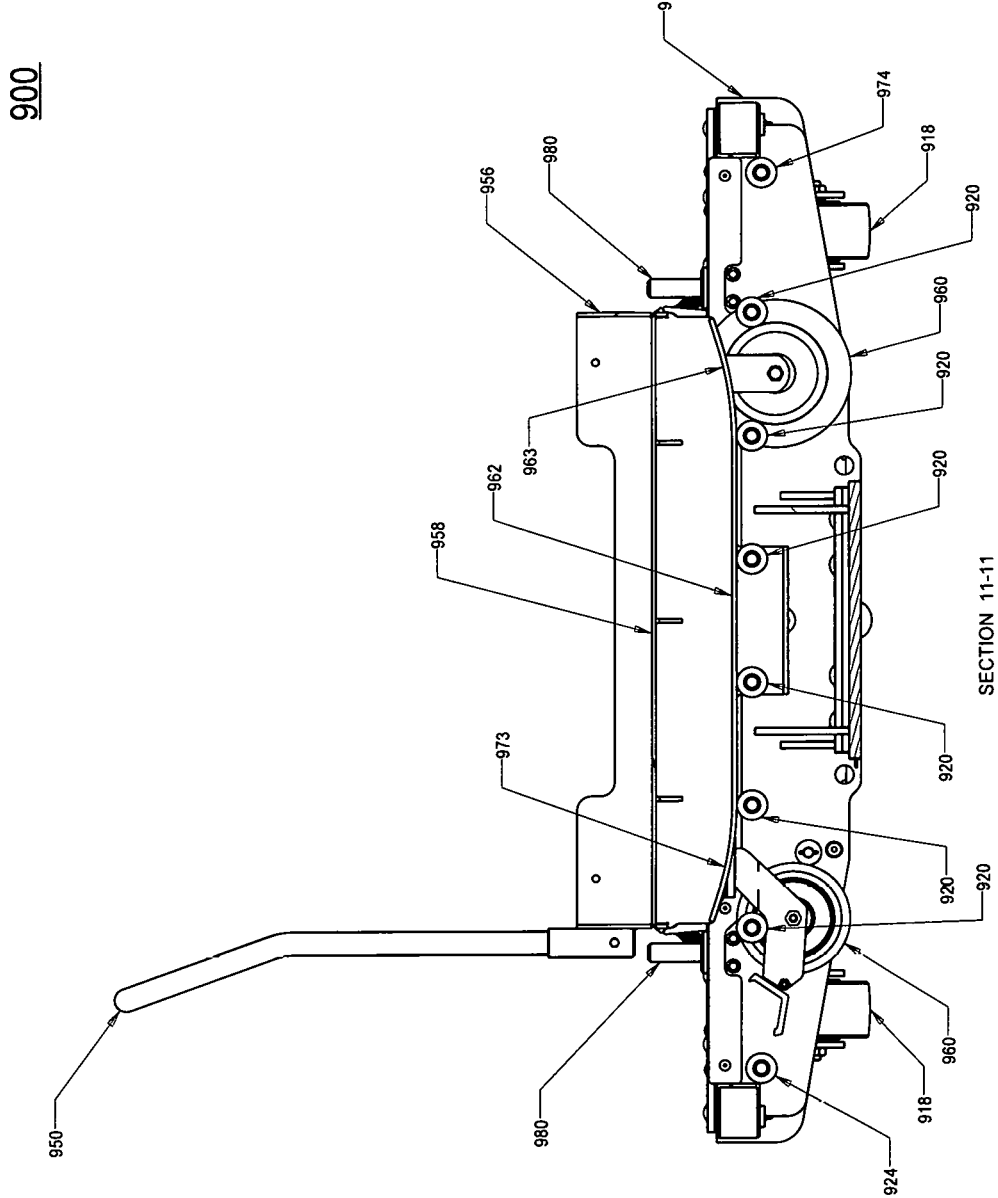
FIG. 9C is a cross-sectional front view of the a tugger cart assembly preparing to load a rider cart onto a tugger cart taken along lines 11-11 of FIG. 9B.
Figure 9D:
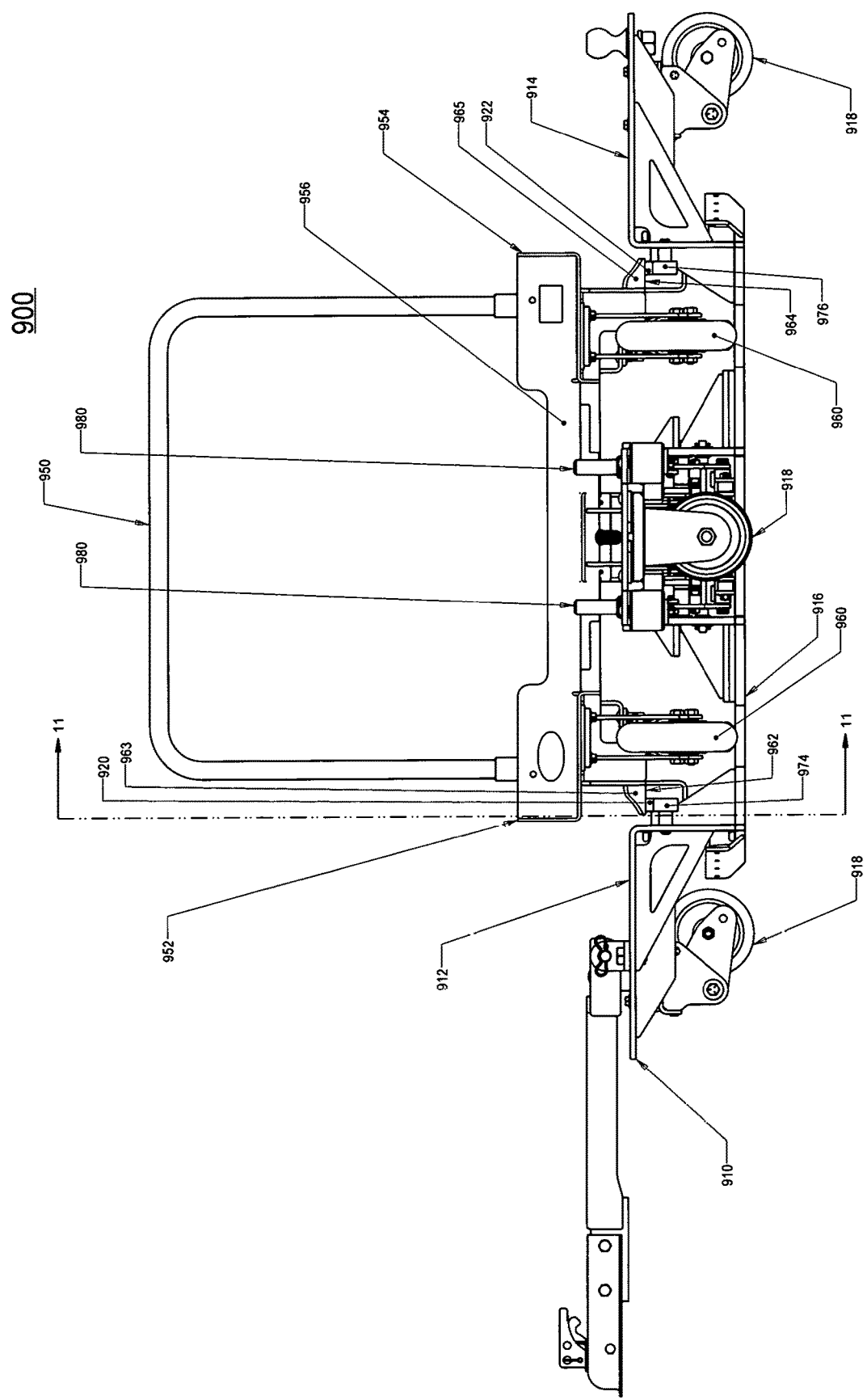
FIG. 9D is the opposite side view of FIG. 9B of a tugger cart assembly preparing to load a rider cart onto a tugger cart according to an embodiment.

Turning now to FIG. 4 which shows an embodiment of an improved rider cart (400) comprising: a rider cart (450) having a first end (452) and a second end (454), the rider cart (450) first end (452) and rider cart (450) second end (454) operatively connected by a central portion (456) to define a load carrying area (458); the rider cart (450) having a plurality of rider wheels (460) operatively connected to the rider cart (450); the rider cart (450) first end (452) having a first wing (462) and the first wing (462) having a first wing first curved portion (463) and a first wing second curved portion (473); the rider cart (450) second end (454) having a second wing (464) and the second wing (464) having a second wing first curved portion (465) and a second wing second curved portion (475).

Turning now to FIGS. 5A, 5B, 5C, 5D and 5E which show an embodiment of an improved tugger and rider cart assembly (500) comprising: a tugger cart (510) having a front side (512) and a rear side (514), the tugger cart (510) front side (512) and the tugger cart (510) rear side (514) operatively connected by a central portion (516) to define a central space wherein the central space is dimensioned to receive a rider cart (550); the tugger cart (510) having a plurality of tugger wheels (518) operatively connected to the tugger cart (510); the tugger cart (510) having a front side first wing (562), the front side first wing (562) having a first wing first curved portion (563); the tugger cart (510) having a rear side second wing (564), the rear side second wing (564) having a second wing first curved portion (565); the rider cart (550) having a first end (552) and a second end (554), the rider cart (550) first end (552) and rider cart (550) second end (554) operatively connected by a central portion (556) to define a load carrying area (558); the rider cart (550) having a plurality of rider wheels (560) operatively connected to the rider cart (550); a rider cart (550) first end (552) having a first end plurality of transport wheels (520) approximately parallel to, but not touching, ground; the rider cart (550) second end (554) having a second end plurality of transport wheels (522) approximately parallel to, but not touching, the ground; the rider cart (550) first end (552) having a first at least one first end loading wheel (524), wherein the first at least one first end loading wheel (524) is farther from the ground than the first end plurality of transport wheels (520); the rider cart (550) second end (554) having a first at least one second end loading wheel (526), wherein the first at least one second end loading wheel (526) is farther from the ground than the second end plurality of transport wheels (522); and wherein the first at least one first end loading wheel (524) and the first wing first curved portion (563) can be operatively connected to each other, and the first at least one second end loading wheel (526) and second wing first curved portion (565) can be operatively connected to each other to allow a user to move the rider cart (550) first end plurality of transport wheels (520) onto the tugger cart (510) front side first wing (562) and the rider cart (550) second end plurality of transport wheels (522) onto the tugger cart (510) rear side second wing (564) such that when the rider cart (550) first end plurality of transport wheels (520) is on the tugger cart (510) first wing (562) and the second end plurality of transport wheels (522) is on the tugger cart (510) second wing (564) the plurality of rider wheels (560) are off of the ground and the plurality of tugger wheels (518) support both the tugger cart (510) and the rider cart (550) to allow the tugger cart (510) to transport the rider cart (550).

Turning now to FIGS. 6A, 6B, 6C, 6D and 6E which show an embodiment of an improved tugger and rider cart assembly (600) wherein the front side first wing (662) further comprises a first wing second curved portion (673), and wherein the rear side second wing (664) further comprises a second wing second curved portion (675).

In still another embodiment the improved tugger and rider cart assembly (600) wherein the rider cart (650) further comprises a second at least one first end loading wheel (674) at an opposite end of the first end plurality of transport wheels (620) from the first at least one first end loading wheel (624), and a second at least one second end loading wheel (676) at an opposite end of the second end plurality of transport wheels (622) from the first at least one second end loading wheel (626), wherein the second at least one first end loading wheel (674) and the second at least one second end loading wheel (676) are farther from the ground than the first end plurality of transport wheels (620) and the second end plurality of transport wheels (622).

In yet another embodiment the improved tugger and rider cart assembly (600) wherein the improved tugger and rider cart assembly (600) further comprises a locking mechanism (680) to secure the rider cart (650) to the tugger cart (610) after loading the rider cart (650) onto the tugger cart (610).

FIGS. 6A, 6B, 6C, 6D and 6E which show another embodiment of an improved tugger and rider cart assembly (600) comprising: a tugger cart (610) having a front side (612) and a rear side (614), the tugger cart (610) front side (612) and the tugger cart (610) rear side (614) operatively connected by a central portion (616) to define a central space wherein the central space is dimensioned to receive a rider cart (650); the tugger cart (610) having a plurality of tugger wheels (618) operatively connected to the tugger cart (610); the tugger cart (610) having a front side first wing (662) and the front side first wing (662) having a first wing first curved portion (663) and a first wing second curved portion (673); the tugger cart (610) having a rear side second wing (664) and the rear side second wing (664) having a second wing first curved portion (665) and a second wing second curved portion (675); a rider cart (650) having a first end (652) and a second end (654), the rider cart (650) first end (652) and rider cart (650) second end (654) operatively connected by a central portion (656) to define a load carrying area (658); the rider cart (650) having a plurality of rider wheels (660) operatively connected to the rider cart (650); the rider cart (650) first end (652) having a first end plurality of transport wheels (620) approximately parallel to, but not touching, ground; the rider cart (650) second end (654) having a second end plurality of transport wheels (622) approximately parallel to, but not touching, the ground; the rider cart (650) first end (652) having a first at least one first end loading wheel (624), and a second at least one first end loading wheel (674) at an opposite end of the first end plurality of transport wheels (620) from the first at least one first end loading wheel (624) wherein the first at least one first end loading wheel (624) and the second at least one first end loading wheel (674) are farther from the ground than the first end plurality of transport wheels (620); the rider cart (650) second end (654) having a first at least one second end loading wheel (626), and a second at least one second end loading wheel (676) at an opposite end of the second end plurality of transport wheels (622) from the first at least one second end loading wheel (626) wherein the first at least one second end loading wheel (626) and the second at least one second end loading wheel (676) are farther from the ground than the second end plurality of transport wheels (622); and wherein the first at least one first end loading wheel (624) and the first wing first curved portion (663) can be operatively connected to each other, and the first at least one second end loading wheel (626) and second wing first curved portion (665) can be operatively connected to each other to allow a user to move the rider cart (650) first end plurality of transport wheels (620) onto the tugger cart (610) front side first wing (662) and the rider cart (650) second end plurality of transport wheels (622) onto the tugger cart (610) rear side second wing (664), or alternatively, the second at least one first end loading wheel (674) and the first wing second curved portion (673) can be operatively connected to each other, and the second at least one second end loading wheel (676) and second wing second curved portion (675) can be operatively connected to each other to allow a user to move the rider cart (650) first end plurality of transport wheels (620) onto the tugger cart (610) front side first wing (662) and the rider cart (650) second end plurality of transport wheels (622) onto the tugger cart (610) rear side second wing (664) such that when the rider cart (650) first end plurality of transport wheels (620) is on the tugger cart (610) front side first wing (662) and the second end plurality of transport wheels (622) is on the tugger cart (610) rear side second wing (664) the plurality of rider wheels (660) are off of the ground and the plurality of tugger wheels (618) support both the tugger cart (610) and the rider cart (650) to allow the tugger cart (610) to transport the rider cart (650).

In another embodiment the improved tugger and rider cart assembly (600) wherein the improved tugger and rider cart assembly (600) further comprises a locking mechanism (680) to secure the rider cart (650) to the tugger cart (610) after loading the rider cart (650) onto the tugger cart (610).

In yet another embodiment an improved tugger and rider cart assembly (600) comprising: a tugger cart (610) having a front side (612) and a rear side (614), the tugger cart (610) front side (612) and the tugger cart (610) rear side (614) operatively connected by a central portion (616) to define a central space wherein the central space is dimensioned to receive a rider cart (650); the tugger cart (610) having a plurality of tugger wheels (618) operatively connected to the tugger cart (610); the tugger cart (610) having a front side first wing (662) and the front side first wing (662) having a first wing first curved portion (663) and a front side first wing second curved portion (673); the tugger cart (610) having a rear side second wing (664) and the rear side second wing (664) having a second wing first curved portion (665) and a second wing second curved portion (675); a rider cart (650) having a first end (652) and a second end (654), the rider cart (650) first end (652) and rider cart (650) second end (654) operatively connected by a central portion (656) to define a load carrying area (658); the rider cart (650) having a plurality of rider wheels (660) operatively connected to the rider cart (650); the rider cart (650) first end (652) having a first end plurality of transport wheels (620) approximately parallel to, but not touching, ground; the rider cart (650) second end (654) having a second end plurality of transport wheels (622) approximately parallel to, but not touching, the ground; the rider cart (650) first end (652) having a first at least one first end loading wheel (624), and a second at least one first end loading wheel (674) at an opposite end of the first end plurality of transport wheels (620) from the first at least one first end loading wheel (624) wherein the first at least one first end loading wheel (624) and the second at least one first end loading wheel (674) are farther from the ground than the first end plurality of transport wheels (620); the rider cart (650) second end (654) having a first at least one second end loading wheel (626), and a second at least one second end loading wheel (676) at an opposite end of the second end plurality of transport wheels (622) from the first at least one second end loading wheel (626) wherein the first at least one second end loading wheel (626) and the second at least one second end loading wheel (676) are farther from the ground than the second end plurality of transport wheels (622); wherein the first at least one first end loading wheel (624) and the first wing first curved portion (663) can be operatively connected to each other, and the first at least one second end loading wheel (626) and second wing first curved portion (665) can be operatively connected to each other to allow a user to move the rider cart (650) first end plurality of transport wheels (620) onto the tugger cart (610) front side first wing (662) and the rider cart (650) second end plurality of transport wheels (622) onto the tugger cart (610) rear side second wing (664), or alternatively, the second at least one first end loading wheel (674) and the first wing second curved portion (673) can be operatively connected to each other, and the second at least one second end loading wheel (676) and second wing second curved portion (665) can be operatively connected to each other to allow a user to move the rider cart (650) first end plurality of transport wheels (620) onto the tugger cart (610) front side first wing (662) and the rider cart (650) second end plurality of transport wheels (622) onto the tugger cart (610) rear side second wing (664) such that when the rider cart (650) first end plurality of transport wheels (620) is on the tugger cart (610) front side first wing (662) and the second end plurality of transport wheels (622) is on the rider cart (650) rear side second wing (664) the plurality of rider wheels (660) are off of the ground and the plurality of tugger wheels (618) support both the tugger cart (610) and the rider cart (650) to allow the tugger cart (610) to transport the rider cart (650); and a locking mechanism (680) to secure the rider cart (650) to the tugger cart (610) after loading the rider cart (650) onto the tugger cart (610).

Turning now to FIGS. 7A, 7B, 7C and 7D which show an embodiment of an improved tugger and rider cart assembly (700) ready to load comprising: a tugger cart (710) having a front side (712) and a rear side (714), the tugger cart (710) front side (712) and the tugger cart (710) rear side (714) operatively connected by a central portion (716) to define a central space wherein the central space is dimensioned to receive a rider cart (750); the tugger cart (710) having a plurality of tugger wheels (718) operatively connected to the tugger cart (710); the tugger cart (710) having a front side plurality of transport wheels (720) approximately parallel to, but not touching, ground; the tugger cart (710) having a rear side plurality of transport wheels (722) approximately parallel to, but not touching, the ground; the tugger cart (710) having a first at least one front side loading wheel (724), wherein the first at least one front side loading wheel (724) is closer to the ground than the front side plurality of transport wheels (720) and a second at least one front side loading wheel (774) at an opposite end of the front side plurality of transport wheels (720) from the first at least one front side loading wheel (724); the tugger cart (710) having a first at least one rear side loading wheel (726), wherein the first at least one rear side loading wheel (726) is closer to the ground than the rear side plurality of transport wheels (722) and a second at least one rear side loading wheel (776) at an opposite end of the rear side plurality of transport wheels (722) from the first at least one rear side loading wheel (726); a rider cart (750) having a first end (752) and a second end (754), the rider cart (750) first end (752) and rider cart (750) second end (754) operatively connected by a central portion (756) to define a load carrying area (758); the rider cart (750) having a plurality of rider wheels (760) operatively connected to the rider cart (750); the rider cart (750) first end (752) having a first wing (762) and the first wing (762) having a first wing first curved portion (763) and a first wing second curved portion (773); the rider cart (750) second end (754) having a second wing (764) and the second wing (764) having a second wing first curved portion (765) and a second wing second curved portion (775); wherein the first at least one front side loading wheel (724) and the first wing first curved portion (763) can be operatively connected to each other, and the first at least one rear side loading wheel (726) and second wing first curved portion (765) can be operatively connected to each other to allow a user to move the rider cart (750) first wing (762) onto the front side plurality of transport wheels (720) and the rider cart (750) second wing (764) onto the rear side plurality of transport wheels (722), or alternatively, the second at least one front side loading wheel (774) and the first wing second curved portion (773) can be operatively connected to each other, and the second at least one rear side loading wheel (776) and second wing second curved portion (775) can be operatively connected to each other to allow a user to move the rider cart (750) first wing (762) onto the front side plurality of transport wheels (720) and the rider cart (750) second wing (764) onto the rear side plurality of transport wheels (722) such that when the rider cart (750) first wing (762) is on the front side plurality of transport wheels (720) and the rider cart (750) second wing (764) is on the rear side plurality of transport wheels (722) the plurality of rider wheels (760) are off of the ground and the plurality of tugger wheels (718) support both the tugger cart (710) and the rider cart (750) to allow the tugger cart (710) to transport the rider cart (750); and a locking mechanism (780) to secure the rider cart (750) to the tugger cart (710) after loading the rider cart (750) onto the tugger cart (710).

Turning now to FIGS. 8A, 8B, 8C and 8D which show an embodiment of an improved tugger and rider cart assembly (800) loading comprising: a tugger cart (810) having a front side (812) and a rear side (814), the tugger cart (810) front side (812) and the tugger cart (810) rear side (814) operatively connected by a central portion (816) to define a central space wherein the central space is dimensioned to receive a rider cart (850); the tugger cart (810) having a plurality of tugger wheels (818) operatively connected to the tugger cart (810); the tugger cart (810) having a front side plurality of transport wheels (820) approximately parallel to, but not touching, ground; the tugger cart (810) having a rear side plurality of transport wheels (822) approximately parallel to, but not touching, the ground; the tugger cart (810) having a first at least one front side loading wheel (824), wherein the first at least one front side loading wheel (824) is closer to the ground than the front side plurality of transport wheels (820) and a second at least one front side loading wheel (874) at an opposite end of the front side plurality of transport wheels (820) from the first at least one front side loading wheel (824); the tugger cart (810) having a first at least one rear side loading wheel (826), wherein the first at least one rear side loading wheel (826) is closer to the ground than the rear side plurality of transport wheels (822) and a second at least one rear side loading wheel (876) at an opposite end of the rear side plurality of transport wheels (822) from the first at least one rear side loading wheel (826); a rider cart (850) having a first end (852) and a second end (854), the rider cart (850) first end (852) and rider cart (850) second end (854) operatively connected by a central portion (856) to define a load carrying area (858); the rider cart (850) having a plurality of rider wheels (860) operatively connected to the rider cart (850); the rider cart (850) first end (852) having a first wing (862) and the first wing (862) having a first wing first curved portion (863) and a first wing second curved portion (873); the rider cart (850) second end (854) having a second wing (864) and the second wing (864) having a second wing first curved portion (865) and a second wing second curved portion (875); wherein the first at least one front side loading wheel (824) and the first wing first curved portion (863) can be operatively connected to each other, and the first at least one rear side loading wheel (826) and second wing first curved portion (865) can be operatively connected to each other to allow a user to move the rider cart (850) first wing (862) onto the front side plurality of transport wheels (820) and the rider cart (850) second wing (864) onto the rear side plurality of transport wheels (822), or alternatively, the second at least one front side loading wheel (874) and the first wing second curved portion (873) can be operatively connected to each other, and the second at least one rear side loading wheel (876) and second wing second curved portion (875) can be operatively connected to each other to allow a user to move the rider cart (850) first wing (862) onto the front side plurality of transport wheels (820) and the rider cart (850) second wing (864) onto the rear side plurality of transport wheels (822) such that when the rider cart (850) first wing (862) is on the front side plurality of transport wheels (820) and the rider cart (850) second wing (864) is on the rear side plurality of transport wheels (822) the plurality of rider wheels (860) are off of the ground and the plurality of tugger wheels (818) support both the tugger cart (810) and the rider cart (850) to allow the tugger cart (810) to transport the rider cart (850); and a locking mechanism (880) to secure the rider cart (850) to the tugger cart (810) after loading the rider cart (850) onto the tugger cart (810).

Turning now to FIGS. 9A, 9B, 9C and 9D which show an embodiment of an improved tugger and rider cart assembly (900) comprising: a tugger cart (910) having a front side (912) and a rear side (914), the tugger cart (910) front side (912) and the tugger cart (910) rear side (914) operatively connected by a central portion (916) to define a central space wherein the central space is dimensioned to receive a rider cart (950); the tugger cart (910) having a plurality of tugger wheels (918) operatively connected to the tugger cart (910); the tugger cart (910) having a front side plurality of transport wheels (920) approximately parallel to, but not touching, ground; the tugger cart (910) having a rear side plurality of transport wheels (922) approximately parallel to, but not touching, the ground; the tugger cart (910) having a first at least one front side loading wheel (924), wherein the first at least one front side loading wheel (924) is closer to the ground than the front side plurality of transport wheels (920) and a second at least one front side loading wheel (974) at an opposite end of the front side plurality of transport wheels (920) from the first at least one front side loading wheel (924); the tugger cart (910) having a first at least one rear side loading wheel (926), wherein the first at least one rear side loading wheel (926) is closer to the ground than the rear side plurality of transport wheels (922) and a second at least one rear side loading wheel (976) at an opposite end of the rear side plurality of transport wheels (922) from the first at least one rear side loading wheel (926); a rider cart (950) having a first end (952) and a second end (954), the rider cart (950) first end (952) and rider cart (950) second end (954) operatively connected by a central portion (956) to define a load carrying area (958); the rider cart (950) having a plurality of rider wheels (960) operatively connected to the rider cart (950); the rider cart (950) first end (952) having a first wing (962) and the first wing (962) having a first wing first curved portion (963) and a first wing second curved portion (973); the rider cart (950) second end (954) having a second wing (964) and the second wing (964) having a second wing first curved portion (965) and a second wing second curved portion (975); wherein the first at least one front side loading wheel (924) and the first wing first curved portion (963) can be operatively connected to each other, and the first at least one rear side loading wheel (926) and second wing first curved portion (965) can be operatively connected to each other to allow a user to move the rider cart (950) first wing (962) onto the front side plurality of transport wheels (920) and the rider cart (950) second wing (964) onto the rear side plurality of transport wheels (922), or alternatively, the second at least one front side loading wheel (974) and the first wing second curved portion (973) can be operatively connected to each other, and the second at least one rear side loading wheel (976) and second wing second curved portion (975) can be operatively connected to each other to allow a user to move the rider cart (950) first wing (962) onto the front side plurality of transport wheels (920) and the rider cart (950) second wing (964) onto the rear side plurality of transport wheels (922) such that when the rider cart (950) first wing (962) is on the front side plurality of transport wheels (920) and the rider cart (950) second wing (964) is on the rear side plurality of transport wheels (922) the plurality of rider wheels (960) are off of the ground and the plurality of tugger wheels (918) support both the tugger cart (910) and the rider cart (950) to allow the tugger cart (910) to transport the rider cart (950); and a locking mechanism (980) to secure the rider cart (950) to the tugger cart (910) after loading the rider cart (950) onto the tugger cart (910).

The components of the apparatus illustrated are not limited to the specific embodiments described herein, but rather, features illustrated or described as part of one embodiment can be used on or in conjunction with other embodiments to yield yet a further embodiment. It is intended that the apparatus include such modifications and variations.

While the apparatus has been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment". "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An improved tugger and rider cart assembly comprising:
   a tugger cart having a front side and a rear side, the tugger cart front side and the tugger cart rear side operatively connected by a central portion to define a central space wherein the central space is dimensioned to receive a rider cart, the central portion comprising a front sidewall and a rear sidewall, the front sidewall comprising an outer surface facing the front side, and the rear sidewall comprising an outer surface facing the rear side;
   the tugger cart having a plurality of tugger wheels operatively connected to the tugger cart;
   the tugger cart having a front side plurality of transport wheels approximately parallel to, but not touching, ground, wherein the front side plurality of transport wheels is coupled to the outer surface of the front sidewall by a plurality of front side axles;
   the tugger cart having a rear side plurality of transport wheels approximately parallel to, but not touching, the ground, wherein the rear side plurality of transport wheels is coupled to the outer surface of the rear sidewall by a plurality of rear side axles;

the tugger cart having a first at least one front side loading wheel coupled to the outer surface of the front sidewall by a front side loading axle at a fixed position closer to the ground than is the front side plurality of transport wheels;

the tugger cart having a first at least one rear side loading wheel coupled to the outer surface of the rear sidewall by a rear side loading axle at a fixed position closer to the ground than is the rear side plurality of transport wheels;

a rider cart having a first end and a second end, the rider cart first end and rider cart second end operatively connected by a central portion to define a load carrying area;

the rider cart having a plurality of rider wheels operatively connected to the rider cart;

the rider cart first end having a first wing and the first wing having a first wing first curved portion;

the rider cart second end having a second wing and the second wing having a second wing first curved portion; and wherein the first at least one front side loading wheel and the first wing first curved portion are configured to be operatively connected to each other, and the first at least one rear side loading wheel and second wing first curved portion are configured to be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels is off of the ground and the plurality of tugger wheels supports both the tugger cart and the rider cart to allow the tugger cart to transport the rider cart.

2. The improved tugger and rider cart assembly of claim 1, wherein the first wing further comprises a first wing second curved portion, and wherein the second wing further comprises a second wing second curved portion.

3. The improved tugger and rider cart assembly of claim 1, wherein the tugger cart further comprises a second at least one front side loading wheel at an opposite end of the front side plurality of transport wheels from the first at least one front side loading wheel, and a second at least one rear side loading wheel at an opposite end of the rear side plurality of transport wheels from the first at least one rear side loading wheel.

4. The improved tugger and rider cart assembly of claim 1, wherein the improved tugger and rider cart assembly further comprises a locking mechanism to secure the rider cart to the tugger cart after loading the rider cart onto the tugger cart.

5. An improved tugger and rider cart assembly comprising:

a tugger cart having a front side and a rear side, the tugger cart front side and the tugger cart rear side operatively connected by a central portion to define a central space wherein the central space is dimensioned to receive a rider cart, the central portion comprising a front sidewall and a rear sidewall, the front sidewall comprising an outer surface facing the front side, and the rear sidewall comprising an outer surface facing the rear side;

the tugger cart having a plurality of tugger wheels operatively connected to the tugger cart;

the tugger cart having a front side plurality of transport wheels approximately parallel to, but not touching, ground, wherein the front side plurality of transport wheels is coupled to the outer surface of the front sidewall by a plurality of front side axles;

the tugger cart having a rear side plurality of transport wheels approximately parallel to, but not touching, the ground, wherein the rear side plurality of transport wheels is coupled to the outer surface of the rear sidewall by a plurality of rear side axles;

the tugger cart having a first at least one front side loading wheel coupled to the outer surface of the front sidewall by a first front side loading axle at a fixed position that is closer to the ground than is the front side plurality of transport wheels and a second at least one front side loading wheel at an opposite end of the front side plurality of transport wheels from the first at least one front side loading wheel, the second at least one front side loading wheel coupled to the outer surface of the front sidewall by a second front side loading axle;

the tugger cart having a first at least one rear side loading wheel coupled to the outer surface of the rear sidewall by a first rear side loading axle at a fixed position that is closer to the ground than is the rear side plurality of transport wheels and a second at least one rear side loading wheel at an opposite end of the rear side plurality of transport wheels from the first at least one rear side loading wheel, the second at least one rear side loading wheel coupled to the outer surface of the rear sidewall by a second rear side loading axle;

a rider cart having a first end and a second end, the rider cart first end and rider cart second end operatively connected by a central portion to define a load carrying area;

the rider cart having a plurality of rider wheels operatively connected to the rider cart;

the rider cart first end having a first wing and the first wing having a first wing first curved portion and a first wing second curved portion;

the rider cart second end having a second wing and the second wing having a second wing first curved portion and a second wing second curved portion; and wherein the first at least one front side loading wheel and the first wing first curved portion are configured to be operatively connected to each other, and the first at least one rear side loading wheel and second wing first curved portion are configured to be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion are configured to be operatively connected to each other, and the second at least one rear side loading wheel and second wing second curved portion are configured to be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels is off of the ground and the plurality of tugger wheels supports both the tugger cart and the rider cart to allow the tugger cart to transport the rider cart.

6. The improved tugger and rider cart assembly of claim 5, wherein the improved tugger and rider cart assembly further comprises a locking mechanism to secure the rider cart to the tugger cart after loading the rider cart onto the tugger cart, wherein the locking mechanism comprises at least a first peg upstanding from the central portion and disposed on one side of the rider cart and a second peg upstanding from the central portion and disposed on an opposing side of the rider cart.

7. An improved tugger and rider cart assembly comprising:
- a tugger cart having a front side and a rear side, the tugger cart front side and the tugger cart rear side operatively connected by a central portion to define a central space wherein the central space is dimensioned to receive a rider cart, the central portion comprising a front sidewall and a rear sidewall, the front sidewall comprising an outer surface facing the front side, and the rear sidewall comprising an outer surface facing the rear side;
- the tugger cart having a plurality of tugger wheels operatively connected to the tugger cart;
- the tugger cart having a front side plurality of transport wheels approximately parallel to, but not touching, ground, wherein the front side plurality of transport wheels is coupled to the outer surface of the front sidewall by a plurality of front side axles;
- the tugger cart having a rear side plurality of transport wheels approximately parallel to, but not touching, the ground, wherein the rear side plurality of transport wheels is coupled to the outer surface of the rear sidewall by a plurality of rear side axles;
- the tugger cart having a first at least one front side loading wheel coupled to the outer surface of the front sidewall by a first front side loading axle at a fixed position that is closer to the ground than is the front side plurality of transport wheels and a second at least one front side loading wheel at an opposite end of the front side plurality of transport wheels from the first at least one front side loading wheel, the second at least one front side loading wheel coupled to the outer surface of the front sidewall by a second front side loading axle;
- the tugger cart having a first at least one rear side loading wheel coupled to the outer surface of the rear sidewall by a first rear side loading axle at a fixed position that is closer to the ground than is the rear side plurality of transport wheels and a second at least one rear side loading wheel at an opposite end of the rear side plurality of transport wheels from the first at least one rear side loading wheel, the second at least one rear side loading wheel coupled to the outer surface of the rear sidewall by a second rear side loading axle;
- a rider cart having a first end and a second end the rider cart first end and rider cart second end being operatively connected by a central portion to define a load carrying area;
- the rider cart having a plurality of rider wheels operatively connected to the rider cart;
- the rider cart first end having a first wing and the first wing having a first wing first curved portion and a first wing second curved portion;
- the rider cart second end having a second wing and the second wing having a second wing first curved portion and a second wing second curved portion;
- wherein the first at least one front side loading wheel and the first wing first curved portion are configured to be operatively connected to each other, and the first at least one rear side loading wheel and second wing first curved portion are configured to be operatively connected to each other to allow a user to move the rider cart first wing onto the front side plurality of transport wheels and the rider cart second wing onto the rear side plurality of transport wheels, or alternatively, the second at least one front side loading wheel and the first wing second curved portion are configured to be operatively connected to each other, and the second at least one rear side loading wheel and second wing second curved portion are configured to be operatively connected to each other to allow a user to move the rider cart first wing onto the front side plurality of transport wheels and the rider cart second wing onto the rear side plurality of transport wheels such that when the rider cart first wing is on the front side plurality of transport wheels and the rider cart second wing is on the rear side plurality of transport wheels the plurality of rider wheels is off of the ground and the plurality of tugger wheels supports both the tugger cart and the rider cart to allow the tugger cart to transport the rider cart; and
- a locking mechanism to secure the rider cart to the tugger cart after loading the rider cart onto the tugger cart.

* * * * *